(12) United States Patent
Kazama

(10) Patent No.: US 11,029,878 B2
(45) Date of Patent: Jun. 8, 2021

(54) INFORMATION PROCESSING SYSTEM

(71) Applicant: FUJITSU LIMITED, Kawasaki (JP)

(72) Inventor: Satoshi Kazama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/609,064

(22) Filed: May 31, 2017

(65) Prior Publication Data
US 2017/0371586 A1   Dec. 28, 2017

(30) Foreign Application Priority Data
Jun. 23, 2016 (JP) ............................. JP2016-125025

(51) Int. Cl.
*G06F 3/06* (2006.01)
*G06F 12/02* (2006.01)

(52) U.S. Cl.
CPC ............ *G06F 3/0656* (2013.01); *G06F 3/061* (2013.01); *G06F 3/0659* (2013.01); *G06F 3/0685* (2013.01); *G06F 3/0688* (2013.01); *G06F 12/0246* (2013.01); *G06F 2212/7202* (2013.01); *G06F 2212/7203* (2013.01)

(58) Field of Classification Search
None
See application file for complete search history.

(56) References Cited

U.S. PATENT DOCUMENTS 5,966,728 A * 10/1999 Amini ................. G06F 12/0835
    711/146
6,173,392 B1 * 1/2001 Shinozaki ............... G06F 9/383
    711/213
6,409,624 B1   6/2002 Sano
(Continued)

FOREIGN PATENT DOCUMENTS

EP   0278471 A2   8/1988
JP   64-1047 A    1/1989
(Continued)

OTHER PUBLICATIONS

Japanese Office Action dated Jan. 28, 2020 for corresponding Japanese Patent Application No. 2016-125025, with English Translation, 14 pages.

*Primary Examiner* — Sean D Rossiter
*Assistant Examiner* — Stephanie Wu
(74) *Attorney, Agent, or Firm* — Fujitsu Patent Center

(57) ABSTRACT

An information processing system includes a first processor, a second processor, a first buffer circuit, a second buffer circuit, and a first memory, wherein the first processor is configured to generate a first read command specifying a first data stored in a first address area of the first memory, the second processor is configured to, based on the first read command, generate a second read command specifying a second data stored in a second address area of the first memory, the first buffer circuit is configured to store the first read command, the second buffer circuit is configured to store the second read command, the second processor is configured to execute the first read command stored in the first buffer circuit, and the second processor is configured to execute the second read command stored in the second buffer circuit when the first buffer circuit is in an empty state.

7 Claims, 22 Drawing Sheets

(56) References Cited

U.S. PATENT DOCUMENTS

| | | | |
|---|---|---|---|
| 2003/0009633 A1* | 1/2003 | Hill | G06F 9/383 711/137 |
| 2003/0033461 A1* | 2/2003 | Malik | G06F 13/18 710/107 |
| 2004/0205301 A1 | 10/2004 | Hara et al. | |
| 2007/0011408 A1* | 1/2007 | Shen | G06F 12/082 711/146 |
| 2008/0077655 A1* | 3/2008 | Ganapathy | G06F 9/383 709/203 |
| 2008/0301399 A1 | 12/2008 | Yasue et al. | |
| 2010/0153661 A1* | 6/2010 | Vamanan | G06F 12/0862 711/154 |
| 2012/0072698 A1* | 3/2012 | Unesaki | G06F 12/0246 711/207 |
| 2015/0199275 A1* | 7/2015 | Radhakrishnan | G06F 12/0862 711/137 |
| 2015/0378919 A1* | 12/2015 | Anantaraman | G06F 12/0862 711/122 |
| 2016/0253266 A1* | 9/2016 | Park | G06F 12/0238 711/154 |
| 2016/0378662 A1* | 12/2016 | Gschwind | G06F 12/0833 711/135 |
| 2017/0132135 A1* | 5/2017 | Gschwind | G06F 12/0862 |

FOREIGN PATENT DOCUMENTS

| | | |
|---|---|---|
| JP | 2001-012589 | 1/2001 |
| JP | 2001-14111 A | 1/2001 |
| JP | 2002-024007 | 1/2002 |
| JP | 2004-164144 | 6/2004 |
| JP | 2004-318940 A | 11/2004 |
| JP | 2006-260067 | 9/2006 |
| JP | 2010-191983 | 9/2010 |

* cited by examiner

FIG. 6A

| COMMAND ID | LOGICAL ADDRESS | DRAM ADDRESS | COMPLETION FLAG |
|---|---|---|---|
| A | a | x | — |
| B | b | y | — |
| ⋮ | ⋮ | ⋮ | ⋮ |

FIG. 6B

| COMMAND ID | LOGICAL ADDRESS | DRAM ADDRESS | COMPLETION FLAG |
|---|---|---|---|
| A | a | x | 1 |
| B | b | y | 1 |
| ⋮ | ⋮ | ⋮ | ⋮ |

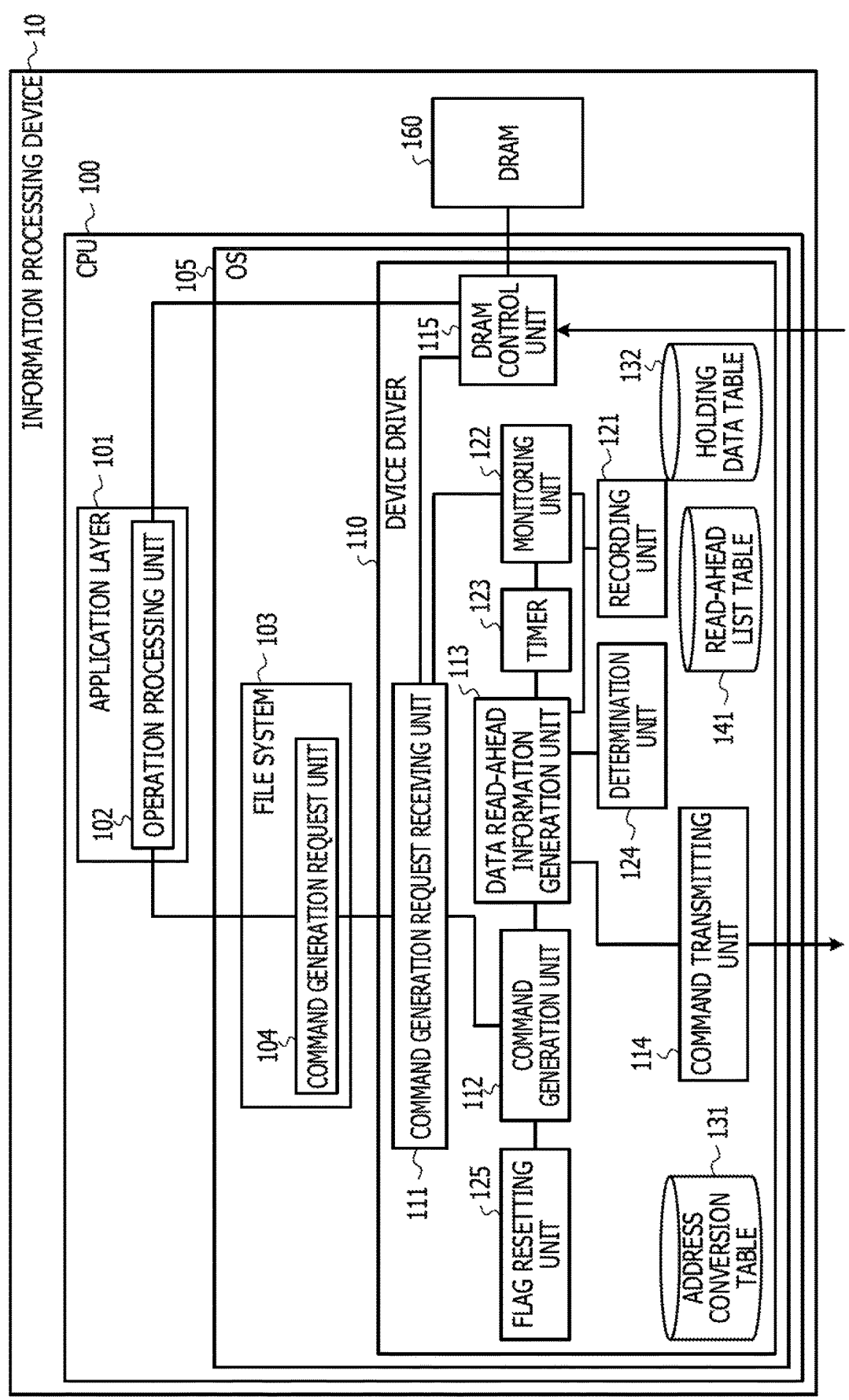

FIG. 18A

| LOGICAL ADDRESS | WRITE TIME | DETERMINATION FLAG |
|---|---|---|
| a | 9 HOUR 13 MINUTE 21.37 SECOND | – |
| b | 9 HOUR 13 MINUTE 21.89 SECOND | – |
| c | 9 HOUR 13 MINUTE 22.15 SECOND | – |
| ⋮ | ⋮ | ⋮ |

FIG. 18B

| LOGICAL ADDRESS | WRITE TIME | DETERMINATION FLAG |
|---|---|---|
| a | 9 HOUR 13 MINUTE 21.37 SECOND | 1 |
| c | 9 HOUR 13 MINUTE 22.15 SECOND | – |
| ⋮ | ⋮ | ⋮ |

INFORMATION PROCESSING SYSTEM

CROSS-REFERENCE TO RELATED APPLICATION

This application is based upon and claims the benefit of priority of the prior Japanese Patent Application No. 2016-125025, filed on Jun. 23, 2016, the entire contents of which are incorporated herein by reference.

FIELD

The embodiments discussed herein are related to an information processing system.

BACKGROUND

When an information processing device such as a server accesses an external storage device such as storage and reads data stored in the external storage device, it is desirable to reduce the time for reading data. Non-volatile memory such as a hard disk drive (HDD), flash memory, or the like is provided in storage, and data is stored within the non-volatile memory. Generally, the time for reading data of non-volatile memory is longer than the time for reading data of volatile memory such as dynamic random access memory (DRAM), static random access memory (SRAM), or the like. In a case where data reading is performed in page units in NAND-type flash memory, it takes about 50 μs to read data of one page, for example.

Processing called data read-ahead or speculative data read is known as a method for efficiently executing data reading from the non-volatile memory. In this data read-ahead processing, for example, when a server reads certain data from the non-volatile memory, the server also reads data that may be used for operation processing or the like in the server, and holds the data in the volatile memory provided in the server. In a case where data is held in the volatile memory by the data read-ahead processing, the server executes operation processing by using the data held in the volatile memory without performing data reading from the non-volatile memory. In this way, it is possible to speed up the operation processing. As a specific process of data read-ahead processing, when a data read command (hereinafter, referred to as a "normal data-read command") specifying a first address of the non-volatile memory is issued by the server, the server specifies a second address to be the target of data read-ahead processing. Then, a normal data-read command that specifies the first address as the target of reading and a data read command (hereinafter, referred to as a data read-ahead command) that specifies the second address as the target of reading are issued. The storage executes the normal data-read command and the data read-ahead command, and transmits the data read from the non-volatile memory to the server.

In the data read-ahead processing, an algorithm called, for example, Look Ahead is known as a method for specifying a target address of data read-ahead. Look Ahead is a method of specifying the next address following the address specified by the normal data-read command as a target address of data read-ahead processing.

In the following part of the present specifications, the notation "data read command" is used as a wording of a superordinate concept including both "normal data-read command" and "data read-ahead command". In addition, the notation "command" is used as a wording of a further superordinate concept including the data read command, other data write commands (program commands), a data remove command (erase command) or the like. As related arts, Japanese Laid-open Patent Publication No. 2001-12589, Japanese Laid-open Patent Publication No. 2006-260067, Japanese Laid-open Patent Publication No. 2010-191983, Japanese Laid-open Patent Publication No. 2002-24007, and Japanese Laid-open Patent Publication No. 2004-164144 are disclosed.

SUMMARY

According to an aspect of the invention, an information processing system includes a first processor, a second processor coupled to the first processor, a first buffer circuit coupled to the second processor, a second buffer circuit coupled to the second processor, and a first memory coupled to the second processor, wherein the first processor is configured to generate a first read command specifying a first data stored in a first address area of the first memory, the second processor is configured to, based on the first read command, generate a second read command specifying a second data stored in a second address area of the first memory different from the first address area, the first buffer circuit is configured to store the first read command, the second buffer circuit is configured to store the second read command, the second processor is configured to execute the first read command stored in the first buffer circuit, and the second processor is configured to execute the second read command stored in the second buffer circuit under a condition that the first buffer circuit is in an empty state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B are diagrams illustrating an example of the contents of a holding data table in the first embodiment;

FIG. 17 is a diagram illustrating functional blocks of an information processing device in a third embodiment;

FIGS. 18A and 18B are diagrams illustrating an example of the contents of a read-ahead list table in the third embodiment;

DESCRIPTION OF EMBODIMENTS

In the case of executing data read-ahead processing, a normal data-read command for reading data that is actually used by the server and a data read-ahead command for reading the data that is predicted to be used by the server are issued. An object of the present embodiment is to suppress execution of the normal data-read command from being delayed due to the execution of the data read-ahead command.

First Embodiment

Figure 1:
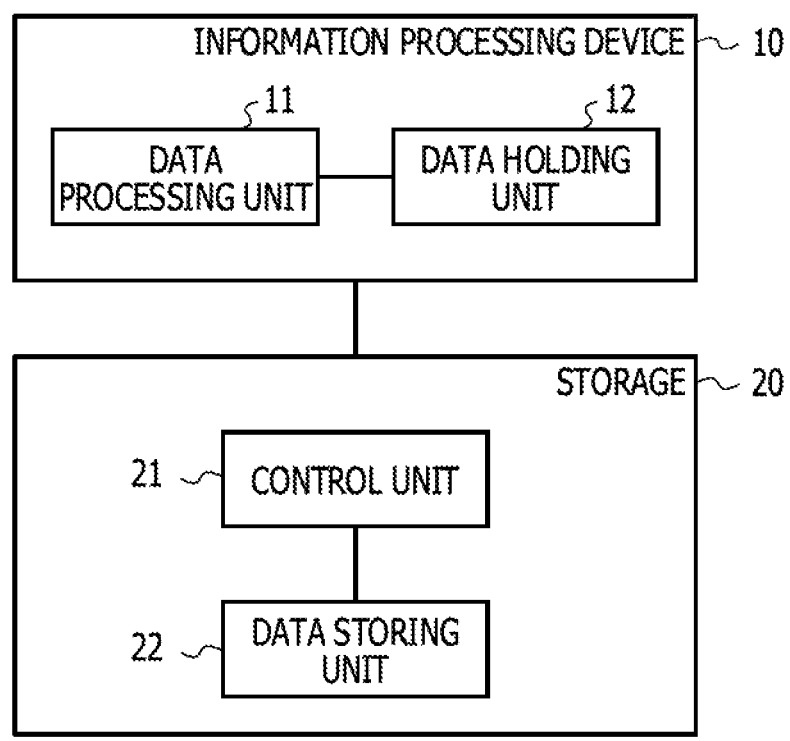
FIG. 1 is a diagram illustrating a system configuration in a first embodiment.

FIG. 1 is a diagram illustrating a system configuration in a first embodiment. The system disclosed in the present embodiment includes an information processing device 10 and a storage 20. As the information processing device 10, a terminal device such as a personal computer (PC) is also applicable in addition to a host device such as a server. As the storage 20, a solid state drive (SSD) or an HDD is applicable. The information processing device 10 includes data processing unit 11 that executes data processing, and a data holding unit 12 that holds the data to be used for data processing in the data processing unit 11 or the data used for data processing in the data processing unit 11. The storage 20 includes a data storing unit 22 that stores data, a control unit 21 that controls processing of storing data to the data storing unit 22 and processing of reading data from the data storing unit 22.

Figure 2:
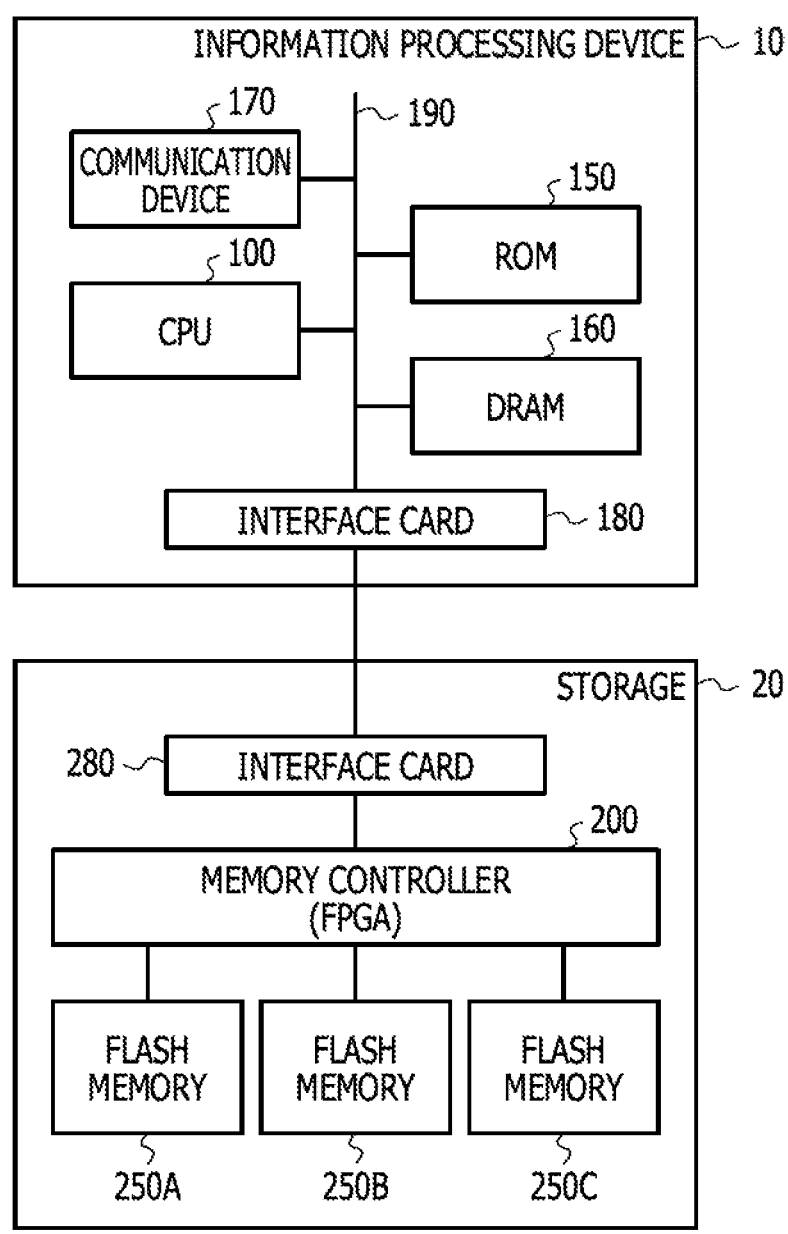
FIG. 2 is a diagram illustrating a hardware configuration of a system in the first embodiment.

FIG. 2 is a diagram illustrating a hardware configuration of a system in the first embodiment. The information processing device 10 includes a central processing unit (CPU) 100, a read only memory (ROM) 150, a DRAM 160, a communication device 170, an interface card 180, and a bus 190. The CPU 100 performs predetermined data processing by downloading a computer program stored in the ROM 150 to the DRAM 160 and executes the program. The CPU 100 is an example of a hardware processor, and a micro control unit (MCU), a micro processing unit (MPU), a digital signal processor (DSP), a field programmable gate array (FPGA), or the like may be used instead of the CPU 100.

In the ROM 150, computer programs and the like executed by the CPU 100 are stored. The ROM 150 is an example of a non-volatile memory device, and mask read only memory (Mask ROM), programmable read only memory (PROM), flash memory, magneto-resistive random access memory (MRAM), resistance random access memory (ReRAM), ferroelectric random access memory (FeRAM) or the like is applicable.

In the DRAM 160, a computer program stored in the ROM 150 is loaded. In addition, the DRAM 160 receives and holds the data processed by the CPU 100 from the storage 20. The DRAM 160 is an example of a volatile memory device, and SRAM may be used as an alternative to the DRAM 160. The communication device 170 is a device for the information processing device 10 to perform data communication with other information processing devices and may include a wireless communication device or a wired communication device. The bus 190 is a physical wiring that connects the CPU 100, the ROM 150, the DRAM 160, and the communication device 170 to each other and functions as a data communication path. The interface card 180 is connected to the CPU 100, the DRAM 160 or the like by the bus 190. The interface card 180 transmits a command such as a data read command (read command) and a data write command (program command) to the storage 20, and receives the data read from the storage 20.

The storage 20 includes a memory controller 200, a flash memory 250A, 250B, and 250C, and an interface card 280. A memory controller 200 is, for example, an FPGA. The memory controller 200 may also be realized using a CPU or an MCU in addition to the FPGA. The flash memory 250A, 250B and 250C are an example of the non-volatile memory device for storing data, and NAND-type flash memory, for example. However, in addition to the NAND-type flash memory, NOR-type flash memory, mask ROM, PROM, MRAM, ReRAM, FeRAM, or the like is also applicable as the non-volatile memory device. In FIG. 2, three chips of the flash memory 250A, 250B, and 250C are illustrated, which are an example of the hardware configuration of the non-volatile memory device, and the number of the non-volatile memory devices (number of chips) is not limited thereto. In the present embodiment, the number of the non-volatile memory devices is referred to as "number of channels". The flash memory 250A corresponds to a first channel, a flash memory 250B corresponds to a second channel, and a flash memory 250C corresponds to a third channel. In addition, in the following part of the present specifications, in a case where there is no intention to specify any one of the three flash memory devices illustrated in the drawing, the devices are simply referred to as a "flash memory 250". In the flash memory 250 of each channel, for example, a memory cell of 2,112 bytes constitutes one page. In addition, one block consists of 64 pages, for example. In the case of the NAND-type flash memory, data removing is performed in units of a block, and data reading and data writing are performed in units of a page.

The interface card 280 receives the commands transmitted from the information processing device 10. The memory controller 200 performs processing such as data reading, data writing, and data removing in the flash memory 250 based on the commands received in the interface card 280. In addition, the memory controller 200 also transmits the data read from the flash memory 250 to the information processing device 10 via the interface card 280.

Hereinafter, an overview of the data read-ahead processing will be described. In a case where data used for executing data processing by the CPU 100 of the information processing device 10 is not held in the DRAM 160, the CPU 100 reads the data from the storage 20 and stores the data in the DRAM 160. At this time, the CPU 100 issues a data read command (normal data-read command) specifying the address of the flash memory 250 in which the data is stored.

Further, the CPU 100 instructs the storage 20 to issue an additional data read command (data read-ahead command) for speculatively reading the data that is predicted to be used for data processing in the CPU 100. The issue instruction of the data read-ahead command may be included within the normal data-read command. The normal data-read command issued by the CPU 100 is transmitted to the memory controller 200 via the interface card 180 of the information processing device 10 and the interface card 280 of the storage 20. The memory controller 200 executes the normal data-read command to read the data from the flash memory 250. The memory controller 200 further reads another data from the flash memory 250 by issuing and executing the data read-ahead command based on the instruction from the CPU 100. The number of the data read-ahead commands issued for one normal data-read command may be one or plural.

In the NAND-type flash memory, data reading is performed in units of a page. It takes, for example, about 50 μs to read data of one page. Therefore, in a case where the memory controller 200 receives a plurality of data read commands, the memory controller 200 holds these commands in, for example, a first in first out (FIFO) buffer. Then, the memory controller 200 executes a plurality of the commands stored in the FIFO buffer in order and causes other commands to stand by in the FIFO buffer until the processing of the currently executing command is completed.

Here, as illustrated in FIG. 2, an example of storing data to a plurality of channels of the flash memory 250 and an example of data read-ahead processing will be described. For example, in the case of storing data of two pages that may be accessed consecutively by the CPU 100 to the flash memory 250, data of one page (a first data) among the data of two pages is stored in the first page of the first block of the flash memory 250A (a first channel), and the remaining data of one page (a second data) is stored in the first page of the first block of the flash memory 250B (a second channel). Then, depending on the generation of a normal data-read command for the first page of the first block of the flash memory 250A, a data read-ahead command is generated for the first page of the first block of the flash memory 250B. Then, the first data is read by executing the normal data-read command for the flash memory 250A and the second data is read by executing the data read-ahead command for the flash memory 250B. In this way, the second data is read without waiting for completion of reading of the first data. Further, in a case where the second data is accessed after the access to the first data, since the second data has already been read from the storage 20 and held in the DRAM 160 of the information processing device 10, the time for reading the second data is reduced.

For example, a plurality of pages of data which may be accessed consecutively by the CPU 100 may be file data that exceeds the capacity of data of one page, or data that is divided and stored over a plurality of pages in the flash memory 250, or the like.

Figure 3A:
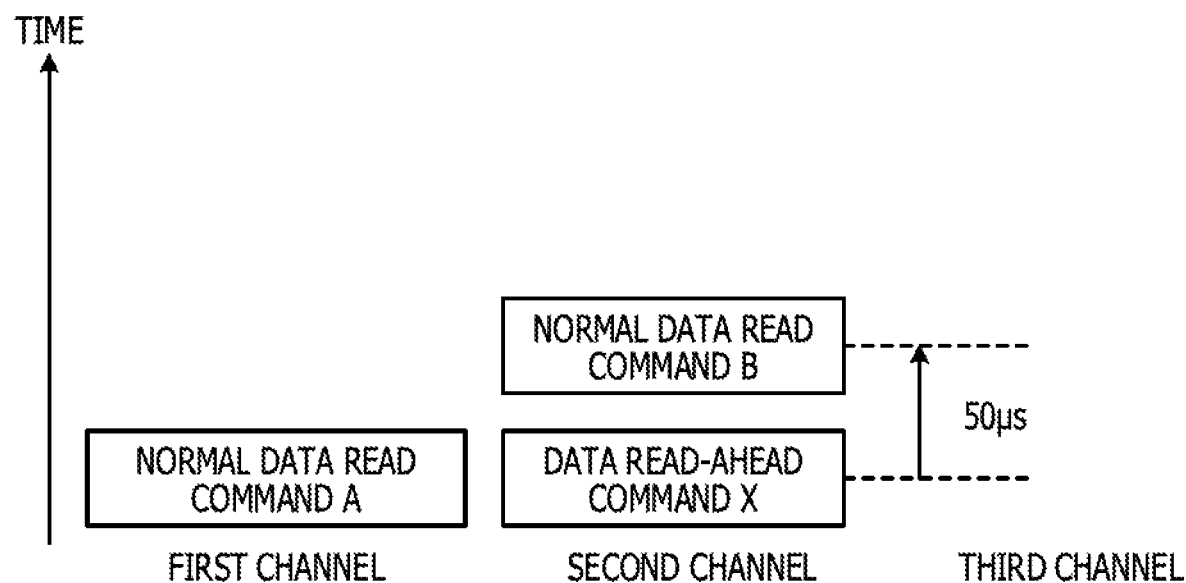
FIGS. 3A and 3B are diagrams for explaining the effect in the first embodiment.
Figure 3B:
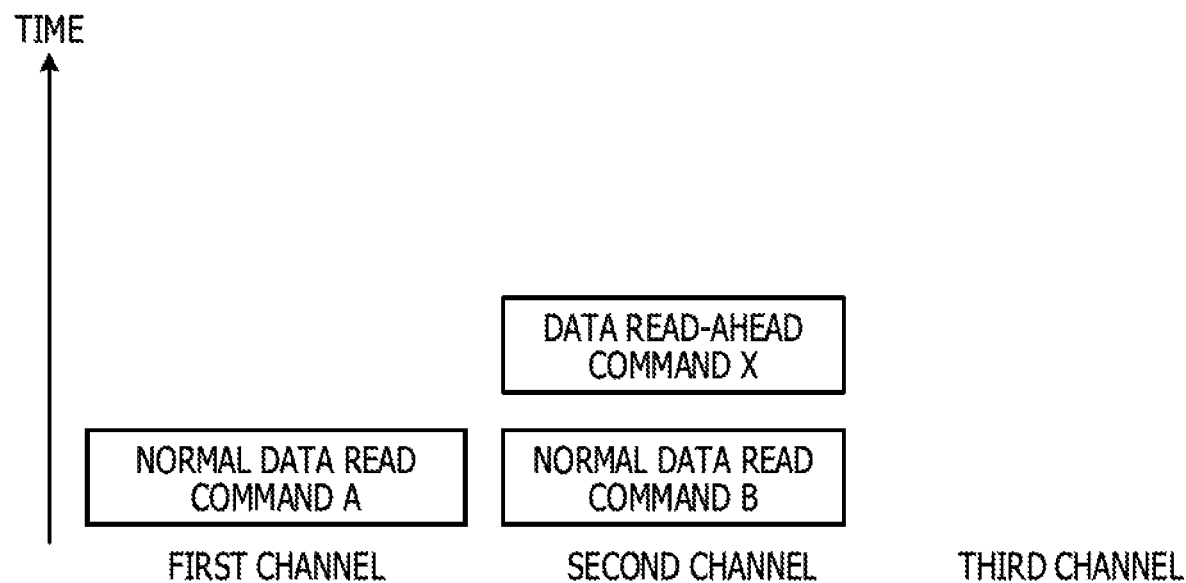

FIGS. 3A and 3B are diagrams for explaining the effect in the first embodiment. For example, the CPU 100 of the information processing device 10 issues a normal data-read command A for a specific address of the flash memory 250. In addition to this normal data-read command A, a data read-ahead command X is issued. The normal data-read command A is assumed to specify the first page of the first block of the flash memory 250A (the first channel) as a target address, and the data read-ahead command X is assumed to specify the first page of the first block of the flash memory 250B (the second channel) as a target address. The normal data-read command A and the data read-ahead command X are stored in an FIFO buffer provided for the first channel and an FIFO buffer provided for the second channel, respectively. Thereafter, the CPU 100 is assumed to further issue a normal data-read command B. The normal data-read command B is assumed to specify the second page of the first block of the flash memory 250B (the second channel). After the data read-ahead command X, the normal data-read command B is stored in the FIFO buffer provided for the second channel, and is in a state of waiting for execution.

The data read-ahead command X is a data read command issued speculatively for the data that may be used by the CPU 100. Therefore, there is a case that data is read from the flash memory 250B and held in the DRAM 160, but may not be actually used by the CPU 100. FIG. 3A illustrates a state in which execution of the normal data-read command B is kept waiting because the data read-ahead command X issued speculatively is held in the FIFO buffer. In the example illustrated in FIG. 3A, for example, if it takes 50 μs to read data of one page of the flash memory 250, the execution of the normal data-read command B is delayed by 50 μs as compared with a case where the data read-ahead command X does not exist within the FIFO buffer. In the present embodiment, execution of the normal data-read command B is suppressed from being delayed due to the execution of the data read-ahead command X.

In the present embodiment, in a case where the normal data-read command B is issued after the data read-ahead command X is issued, if the data read-ahead command X is waiting to be executed within the FIFO buffer, the normal data-read command B is preferentially executed rather than the data read-ahead command X. FIG. 3B illustrates how the normal data-read command B is preferentially executed over the data read-ahead command X. In the example illustrated in FIG. 3B, the normal data-read command B is executed at an earlier timing as compared with the example illustrated in FIG. 3A.

Figure 4:
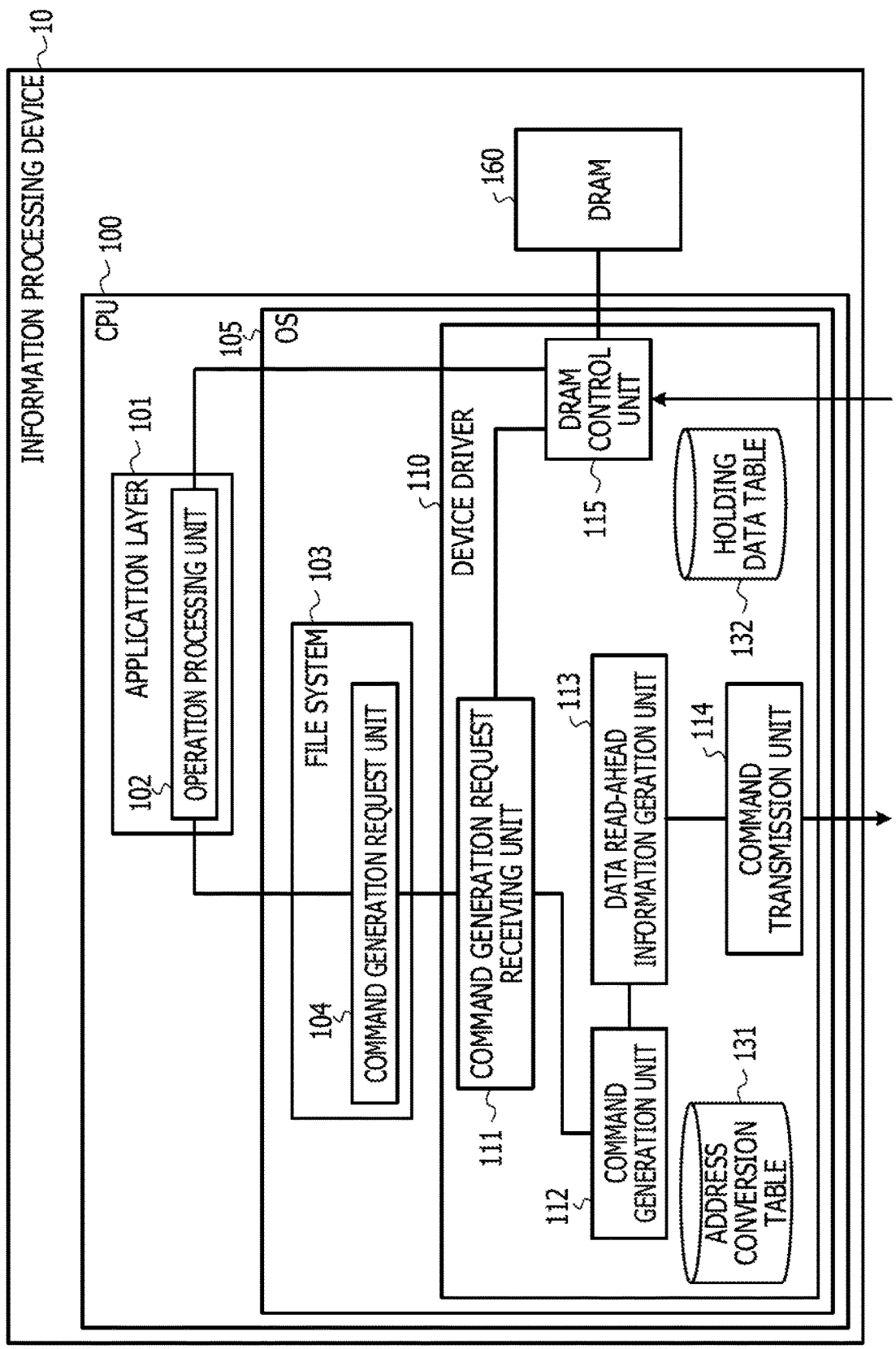
FIG. 4 is a diagram illustrating functional blocks of an information processing device in the first embodiment.

FIG. 4 is a diagram illustrating functional blocks of the information processing device 10, mainly the CPU 100 in the first embodiment. For example, the CPU 100 functions as an operation processing unit 102, a command generation request unit 104, a command generation request receiving unit 111, a command generation unit 112, a data read-ahead information generation unit 113, a command transmission unit 114, and a DRAM control unit 115 by executing the computer program loaded into the DRAM 160 from the ROM 150. In FIG. 4, the operation processing unit 102 is realized by, for example, an application layer 101. The command generation request unit 104 is realized by, for example, a file device 103 of an operating system (OS) 105. The command generation request receiving unit 111, the command generation unit 112, the data read-ahead information generation unit 113, the command transmission unit 114, and the DRAM control unit 115 are realized by, for example, a device driver 110 of the OS 105. In addition, the CPU 100 holds an address conversion table 131 and a holding data table 132.

The operation processing unit 102 performs operation processing based on the data held in the DRAM 160. The command generation request unit 104 requests generation of a data read command to the command generation request receiving unit 111 in order to read data used for operation processing of the operation processing unit 102 from the storage 20. When the command generation request receiving unit 111 receives the generation request of the data read command from the command generation request unit 104, the command generation request receiving unit 111 instructs the command generation unit 112 to generate the normal data-read command. The command generation unit 112 issues the normal data-read command for reading the data requested by the command generation request unit 104. The generated normal data-read command is passed to the data read-ahead information generation unit 113. The data read-ahead information generation unit 113 generates data read-ahead information for reading the data that is predicted to be used by the operation processing unit 102, which is different from the data requested by the command generation request unit 104, and adds the information to the normal data-read command. The data read-ahead information is information of the address within the flash memory 250 in which data to be the target of read-ahead processing is stored.

When the command generation unit 112 and the data read-ahead information generation unit 113 respectively generate the normal data-read command and the data read-ahead information, the address managed by the operation processing unit 102 (hereinafter, referred to as a "logical address") is converted into an address managed by the storage 20 (hereinafter, referred to as a "flash memory address"). The address conversion table 131 holds a corresponding relationship between the logical address and the flash memory address. When the command generation unit 112 issues a normal data-read command, the command generation unit 112 includes read data information specifying an address of the flash memory 250, for example, a channel number, a block number, and a page number, in the normal data-read command by referring to the address conversion table 131. In addition, when the data read-ahead information generation unit 113 generates data read-ahead information, the data read-ahead information generation unit 113 adds the data read-ahead information specifying the address of the flash memory 250, for example, the channel number, the block number, and the page number, to the normal data-read command by referring to the address conversion table 131, as appropriate. The normal data-read command with the data read-ahead information added by the data read-ahead information generation unit 113 is transmitted to the storage 20 via the command transmission unit 114.

Figure 5A:
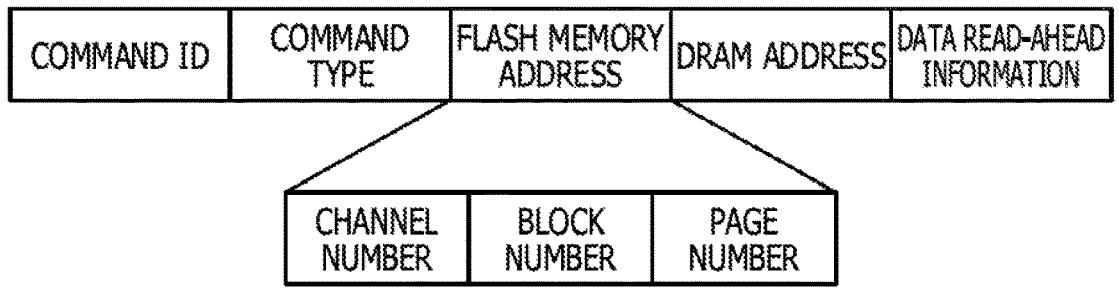
FIGS. 5A, 5B, 5C, and 5D are diagrams illustrating a data structure of a command in the first embodiment.

FIG. 5A is a diagram illustrating an example of a data configuration of the command generated in the command generation unit 112 and the data read-ahead information generation unit 113. The command includes an area in which a "command ID", a "command type", a "flash memory address", a "DRAM address", and "data read-ahead information" are respectively registered. The "command ID" is an identifier for identifying each command, and an individual identifier is attached to each command. The "command type" is information indicating the type of a command. Types of commands for the flash memory 250 include, for example, a data read command, a data write command, a data remove command, and the like. In the normal data-read command, information indicating that the command is a command requesting data reading is registered in the area of the "command type". In the data read command, information specifying the address of the flash memory 250 in which the data to be read is stored is registered in the area of the "flash memory address". For example, the channel number, the block number, and the page number are registered in the area of the "flash memory address". In addition, in a case where a command is a data read command, an address for specifying which address of the DRAM 160 the data read from the flash memory 250 is to be stored in (hereinafter, referred to as a "DRAM address") is registered in the area of the "DRAM address". Further, in a case where a command is a data read command, information indicating necessity of generating the data read-ahead command, address information of the flash memory 250 to be the target of data read-ahead, and the like are registered in the area of "data read-ahead information". The data read-ahead information is generated by the data read-ahead information generation unit 113 and added to the normal data-read command.

Figure 5B:
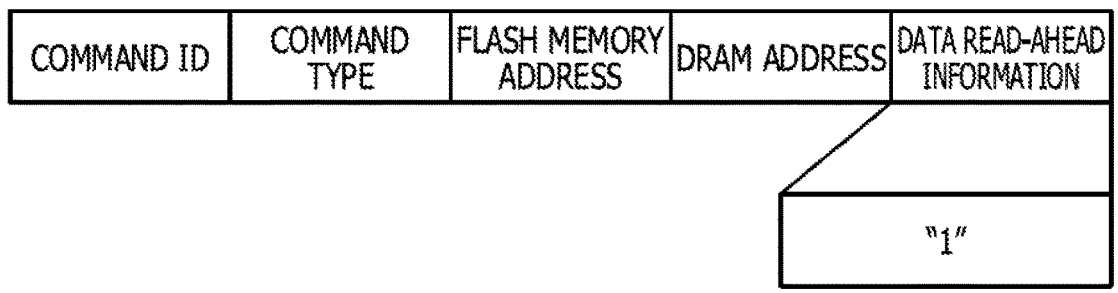

FIG. 5B is a diagram illustrating a first example of data read-ahead information. In FIG. 5B, information indicating necessity of generating a data read-ahead command is registered as the data read-ahead information. For example, the value "1" registered in the data read-ahead information means that issuance of a data read-ahead command is requested, and the value "0" stored in the data read-ahead information means that issuance of a data read-ahead command is unnecessary. For example, in a case where a plurality of times of the most recent data access are performed for a random logical address by the CPU 100, the data read-ahead information generation unit 113 determines that generation of a data read-ahead command is unnecessary and registers "0" as the data read-ahead information. Conversely, the data read-ahead information generation unit 113 determines that a data read-ahead command has to be generated and registers "1" as the data read-ahead information in a case where a plurality of times of the most recent data access are performed for consecutive logical addresses by the CPU 100. The storage 20 generates a data read-ahead command in a case where the data read-ahead information of a received normal data-read command is "1". In FIG. 5B, the flash memory address to be the target of data read-ahead is not included in the data read-ahead information. In this case, the storage 20 refers to the information registered in the "flash memory address" of the received normal data-read command. For example, in a case where the "flash memory address" specified in the normal data-read command is the first page of the first block of the first channel, a data read-ahead command specifying the first page of the first block of the second channel as a target address of the data read-ahead and a data read-ahead command specifying the first page of the first block of the third channel as a target address of the data read-ahead are generated.

Figure 5C:
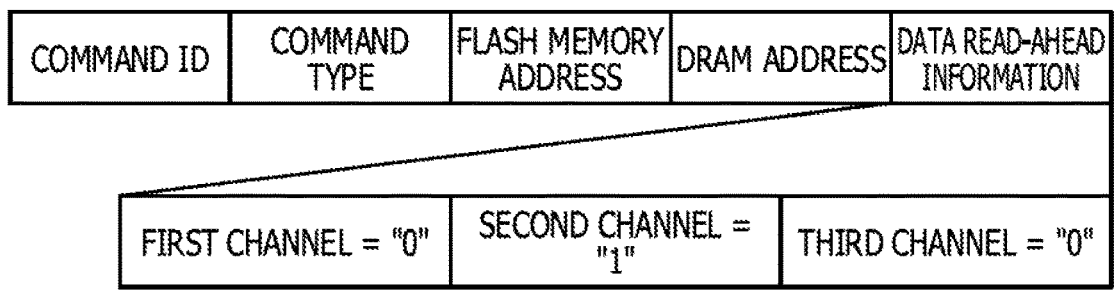

FIG. 5C is a diagram illustrating a second example of data read-ahead information. In the second example, information indicating necessity of generating a data read-ahead command is registered as the data read-ahead information for each channel. In FIG. 5C, a case where the data read-ahead information for the first channel is "0", the data read-ahead information for the second channel is "1", and the data read-ahead information for the third channel is "0" is illustrated. The "flash memory address" specified in the normal data-read command is assumed to be the first page of the first block of the first channel. In this case, the storage 20 generates a data read-ahead command specifying the first page of the first block of the second channel as the target address of data read-ahead, but the storage 20 does not generate a data read-ahead command for the first channel and the third channel.

Figure 5D:
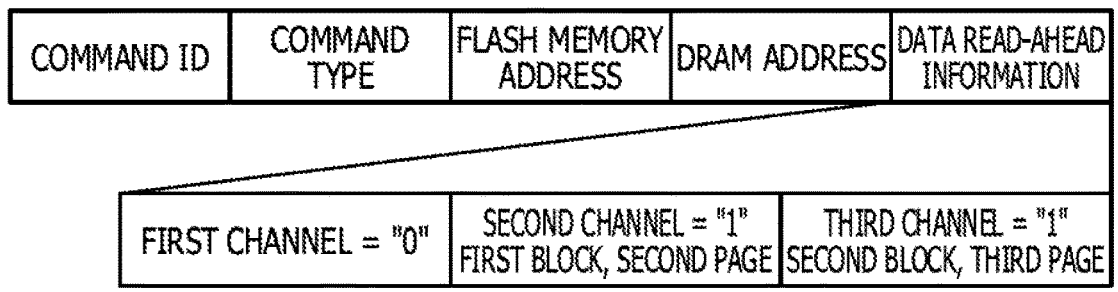

FIG. 5D is a diagram illustrating a third example of data read-ahead information. In the third example, in addition to the information indicating necessity of generating a data read-ahead command, a target address of data read-ahead processing is registered as the data read-ahead information for each channel. In this way, it possible to generate a data read-ahead command that is targeting a flash memory address which is different for each channel. In the example of FIG. 5D, a data read-ahead command is not generated for the first channel, and a data read-ahead command for the second page of the first block of the second channel and a data read-ahead command for the third page of the second block of the third channel are generated.

FIGS. 6A and 6B are diagrams illustrating an example of the contents of a holding data table 132 illustrated in FIG. 4. In the holding data table 132, information about the "command ID", the "logical address", the "DRAM address", and a "completion flag" may be registered. In a case where the command generation unit 112 and the data read-ahead information generation unit 113 respectively generate a normal data-read command and data read-ahead information, the command generation unit 112 and the data read-ahead information generation unit 113 register the generated normal data-read command, the command ID of the generated data read-ahead command in the storage 20, the logical address of the data to be read (hereinafter, referred to as a "read target address"), and the DRAM address indicating the area in which the read data is held, in the holding data table 132. FIG. 6A corresponds to generation of a data read command and illustrates the contents of the holding data table 132 in a state in which related information is registered. For example, it is assumed that the command generation request unit 104 performs a generation request of a data read command for a logical address "a", the command generation unit 112 generates a normal data-read command (command ID is "A") for the logical address "a", and the data read-ahead information generation unit 113 instructs the storage 20 to generate data read-ahead information (command ID of a data read-ahead command is "B") for a logical address "b". In this case, as illustrated in FIG. 6A, a command ID, a logical address, and a DRAM address are registered in the holding data table 132 for each generated command. When the data read-ahead information generation unit 113 instructs the storage 20 to generate a data read-ahead command, the data read-ahead information generation unit 113 includes the command ID information in the data read-ahead information. The meaning of FIG. 6B and the "completion flag" will be described later.

Figure 7:
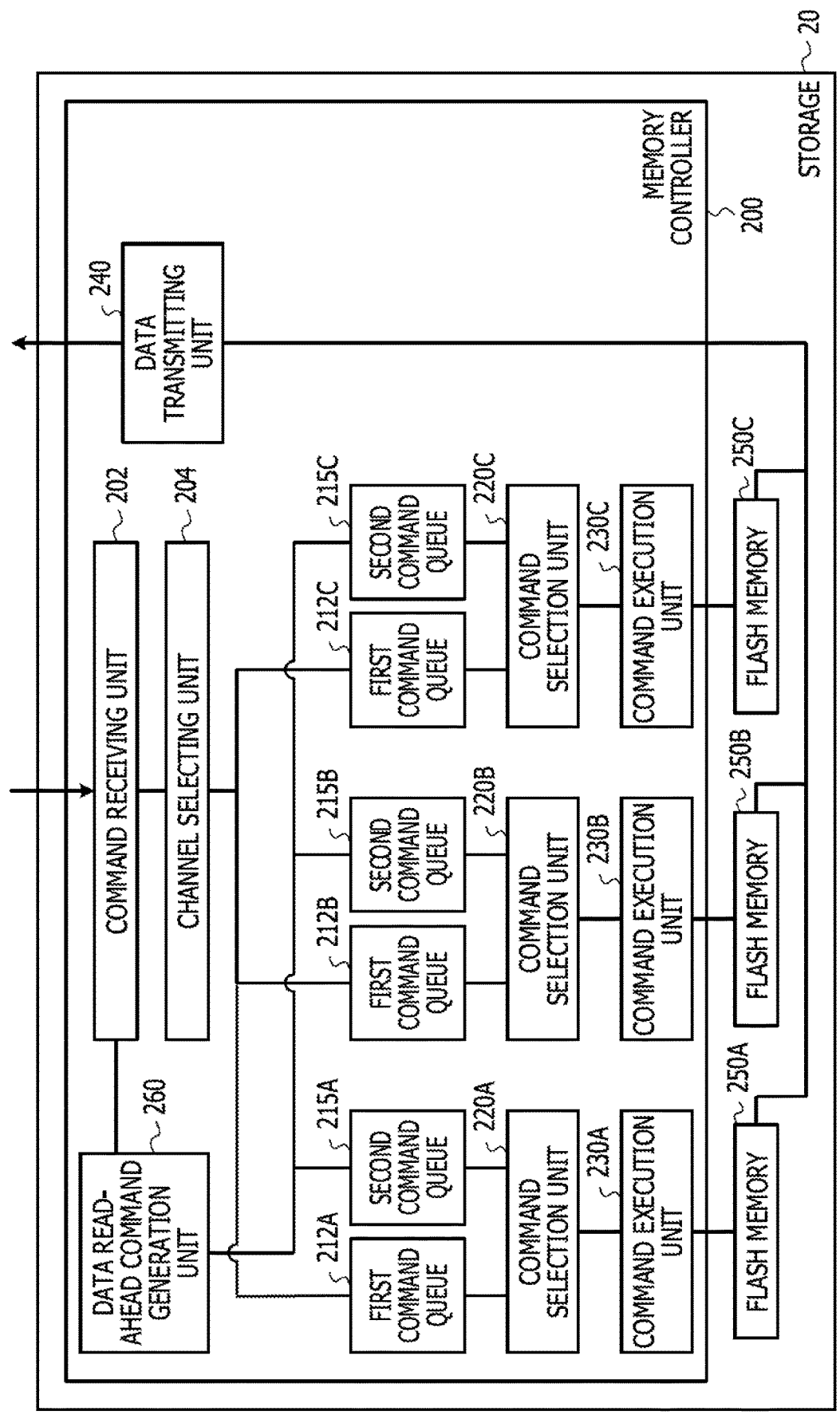
FIG. 7 is a diagram illustrating functional blocks of storage in the first embodiment.

FIG. 7 is a diagram illustrating functional blocks of the storage 20, mainly the memory controller 200 in the first embodiment. The memory controller 200 of the storage 20 functions as a command receiving unit 202, a channel selection unit 204, a data read-ahead command generation unit 260, first command queues 212A, 21213, and 212C (in a case where there is no intention to specify any one of the three first command queues, simply referred to as "the first command queue 212"), second command queues 215A, 215B, and 215C (in a case where there is no intention to specify any one of the three second command queues, simply referred to as "the second command queue 215"), command selection units 220A, 220B, and 220C (in a case where there is no intention to specify any one of the three command selection units, simply referred to as a "command selection unit 220"), command execution units 230A, 230B, and 230C (in a case where there is no intention to specify any one of the three command execution units, simply referred to as a "command execution unit 230"), and a data transmission unit 240. In a case where the memory controller 200 is implemented using an FPGA, each of the functional blocks described above is realized by setting a plurality of reconfigurable gates (gate arrays) provided within the FPGA in a desired connection state. In a case where the memory controller 200 is implemented using a processor such as a CPU, each of the functional blocks described above is realized by the processor executing a computer program.

The command receiving unit 202 receives a command transmitted from the command transmission unit 114 of the information processing device 10. The channel selection unit 204 selects a channel corresponding to the command received in the command receiving unit 202 based on the channel information of the flash memory address included in the command. The first command queue 212, the second command queue 215, the command selection unit 220, and the command execution unit 230 are provided for each channel. The command with the channel selected by the channel selection unit 204 is input to the first command queue 212 of the selected channel. Further, in a case where the received command is a data read command, the command receiving unit 202 replicates the command and transmits the command to the data read-ahead command generation unit 260. The data read-ahead command generation unit 260 extracts the data read-ahead information from the replicated normal data-read command and determines necessity of generating a data read-ahead command. In a case where a data read-ahead command has to be generated, the data read-ahead command generation unit 260 generates a data read-ahead command and holds the generated data read-ahead command to the second command queue 215. The first command queue 212 and the second command queue 215 are realized by, for example, an FIFO buffer, respectively.

In this way, in the present embodiment, the second command queue 215 is provided separately from the first command queue 212 which holds commands such as a normal data-read command and the like, and a data read-ahead command is selectively input to the second command queue 215. In the above example, the command receiving unit 202 transmits the replicated command to the data read-ahead command generation unit 260, but instead of the replicated command, the data read-ahead information included in the received command may be selectively notified to the data read-ahead command generation unit 260. In this case, the data read-ahead command generation unit 260 determines necessity of generating a data read-ahead command and executes generation processing of the data read-ahead command based on the notified data read-ahead information.

Next, the command selection unit 220 selects and retrieves the command stored in the first command queue 212 and the second command queue 215, and delivers the command to the command execution unit 230. In the case where commands are accumulated in the first command queue 212, even if a data read-ahead command is held in the second command queue 215, the command selection unit 220 preferentially selects and retrieves the commands that are held in the first command queue 212. The commands selected in the command selection unit 220 are executed by the command execution unit 230. The command execution unit 230 executes the commands based on the information indicating the command type registered in the commands. In a case where the command type of the commands are data read, the command execution unit 230 executes data reading from the flash memory 250.

The command selection unit 220 processes all the commands held in the first command queue 212, and determines whether or not a data read-ahead command is held in the second command queue 215 in a case where the first command queue 212 becomes empty. In a case where a data read-ahead command is held in the second command queue 215, the command selection unit 220 retrieves the data read-ahead command from the second command queue 215 and delivers the command to the command execution unit 230. Then, the data read-ahead command is executed by the command execution unit 230, and data is read from the flash memory 250. In this way, by executing a normal data-read command with priority over the execution of a data read-ahead command, it is possible to suppress the delay of execution of the normal data-read command.

The data read from the flash memory 250 is transmitted to the information processing device 10 via the data transmission unit 240. The data transmitted from the data transmission unit 240 is transmitted together with the information of the DRAM address included in the command issued from the information processing device 10. In addition, the data transmission unit 240 also transmits a notification of command execution completion to the information processing device 10.

Returning to the explanation of FIG. 4, the DRAM control unit 115 receives the data transmitted from the data transmission unit 240 of the storage 20. Then, the DRAM control unit 115 writes the received data to a predetermined address of the DRAM 160. In addition, the command generation unit 112 or the data read-ahead information generation unit 113 registers the completion flag indicating that data read processing has been completed with respect to the corresponding normal data-read command and the data read-ahead command, in the holding data table 132, based on the notification of command execution completion transmitted from the data transmission unit 240. FIG. 6B illustrates the contents of the holding data table 132 with the completion flag registered. With respect to a command (normal data-read command in the present embodiment) of which the command ID is "A" and the logical address is "a", the completion flag indicating that the data read from the flash memory 250 is written in the area of the DRAM address "x", is recorded in the holding data table 132. Further, with respect to a command (data read-ahead command in the present embodiment) of which the command ID is "B" and the logical address is "b", the completion flag indicating that the data read from the flash memory 250 is written in the area of the DRAM address "y", is recorded in the holding data table 132.

Next, the processing within the information processing device 10 in a case where generation of a data read command specifying the logical address "b" is requested by the command generation request unit 104 will be described.

The command generation request receiving unit 111 receives a request to generate a data read command for the logical address "b". The command generation request receiving unit 111 refers to the holding data table 132 and determines whether or not the data corresponding to the logical address "b" is stored in the DRAM 160. In the example illustrated in FIG. 6B, since the data corresponding to the logical address "b" has already been stored in the DRAM 160, the command generation request receiving unit 111 instructs the DRAM control unit 115 to read the data stored in the area of the DRAM address "y". The DRAM control unit 115 accesses the DRAM 160, reads the data held in the area of the DRAM address "y", and delivers the data to the operation processing unit 102. As a result, when the operation processing unit 102 uses the data of the logical address "b", the time for reading data is reduced.

Figure 8:
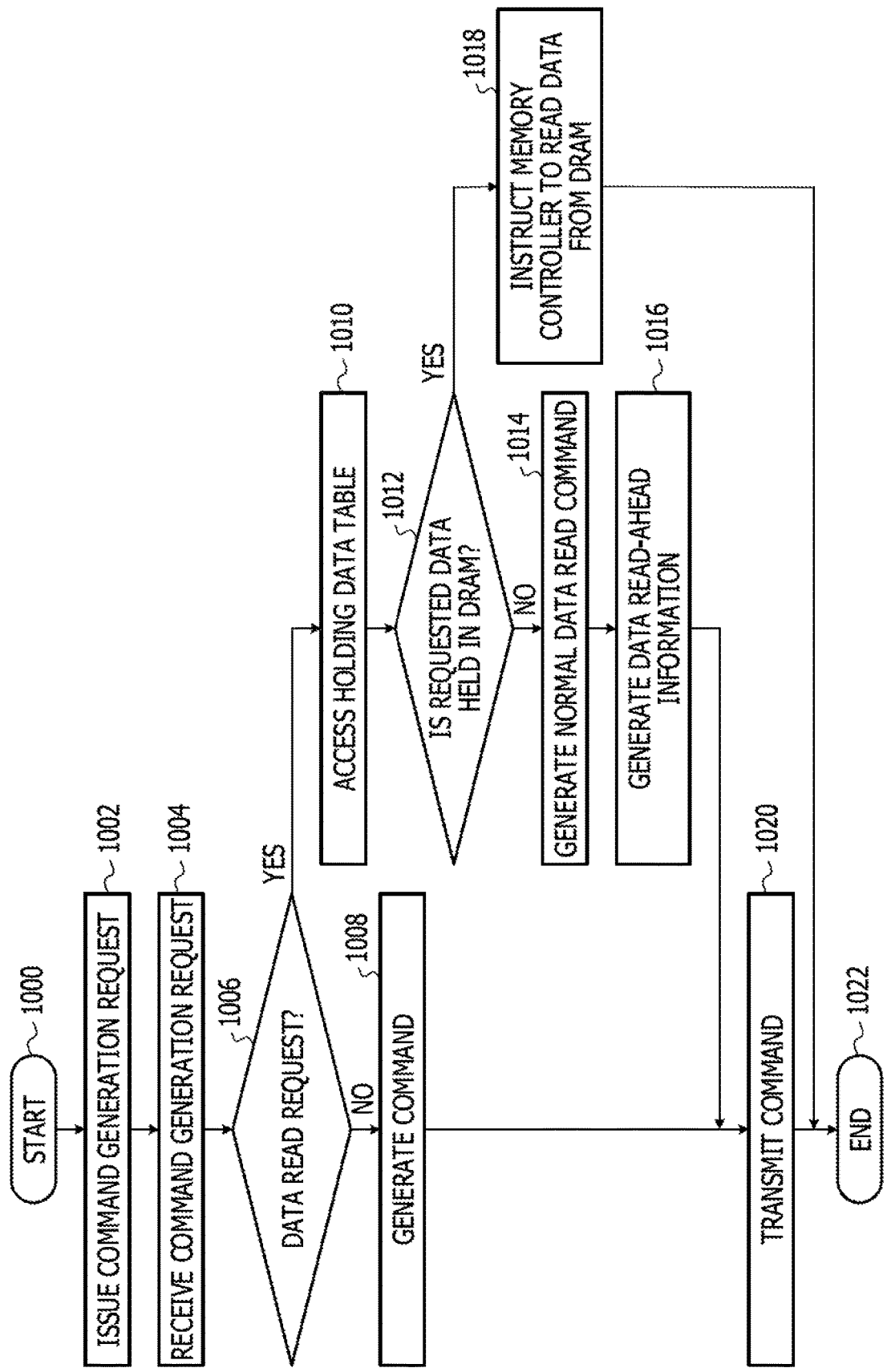
FIG. 8 is a flowchart of processing executed by a CPU in the first embodiment.

FIG. 8 is a flowchart of processing mainly related to generation of a command in the processing executed by the CPU 100. The processing flow illustrated in FIG. 8 is initiated by processing 1000, and in the processing 1002, the command generation request unit 104 issues a command generation request. In processing 1004, the command generation request receiving unit 111 receives the command generation request. In processing 1006, the command generation request receiving unit 111 determines whether or not the received command generation request is for data reading. In a case where it is not determined that the command generation request is for data reading, the processing flow proceeds to processing 1008, and in a case where it is determined that the command generation request is for data reading, the processing flow proceeds to processing 1010. In processing 1008, the command generation unit 112 generates a command, for example, a data write command or a data remove command according to the request content of the command generation request. In a case where the processing flow proceeds from the processing 1006 to the processing 1010, the command generation request receiving unit 111 accesses the holding data table 132 in the processing 1010. Then, in processing 1012, it is determined whether or not the data requested in the command generation request is held in the DRAM 160. In a case where it is determined that the requested data is held in the DRAM 160, the processing flow proceeds to processing 1018, and in a case where it is not determined that the requested data is held in the DRAM 160, the processing flow proceeds to processing 1014. In processing 1018, the command generation request receiving unit 111 instructs the DRAM control unit 115 to read the corresponding data from the DRAM 160. In this case, command generation processing is not performed, and the processing flow ends at processing 1022. On the other hand, in a case where the processing flow proceeds from processing 1012 to processing 1014, the command generation unit 112 generates a normal data-read command in processing 1014. Further, in processing 1016, the data read-ahead information generation unit 113 generates data read-ahead information and adds the information to the normal data-read command. Then, in the processing 1020, the command transmission unit 114 transmits the command generated in the processing 1008 or the normal data-read command including the data read-ahead information generated in the processing 1014 and the processing 1016, and the processing flow ends at processing 1022.

Figure 9:
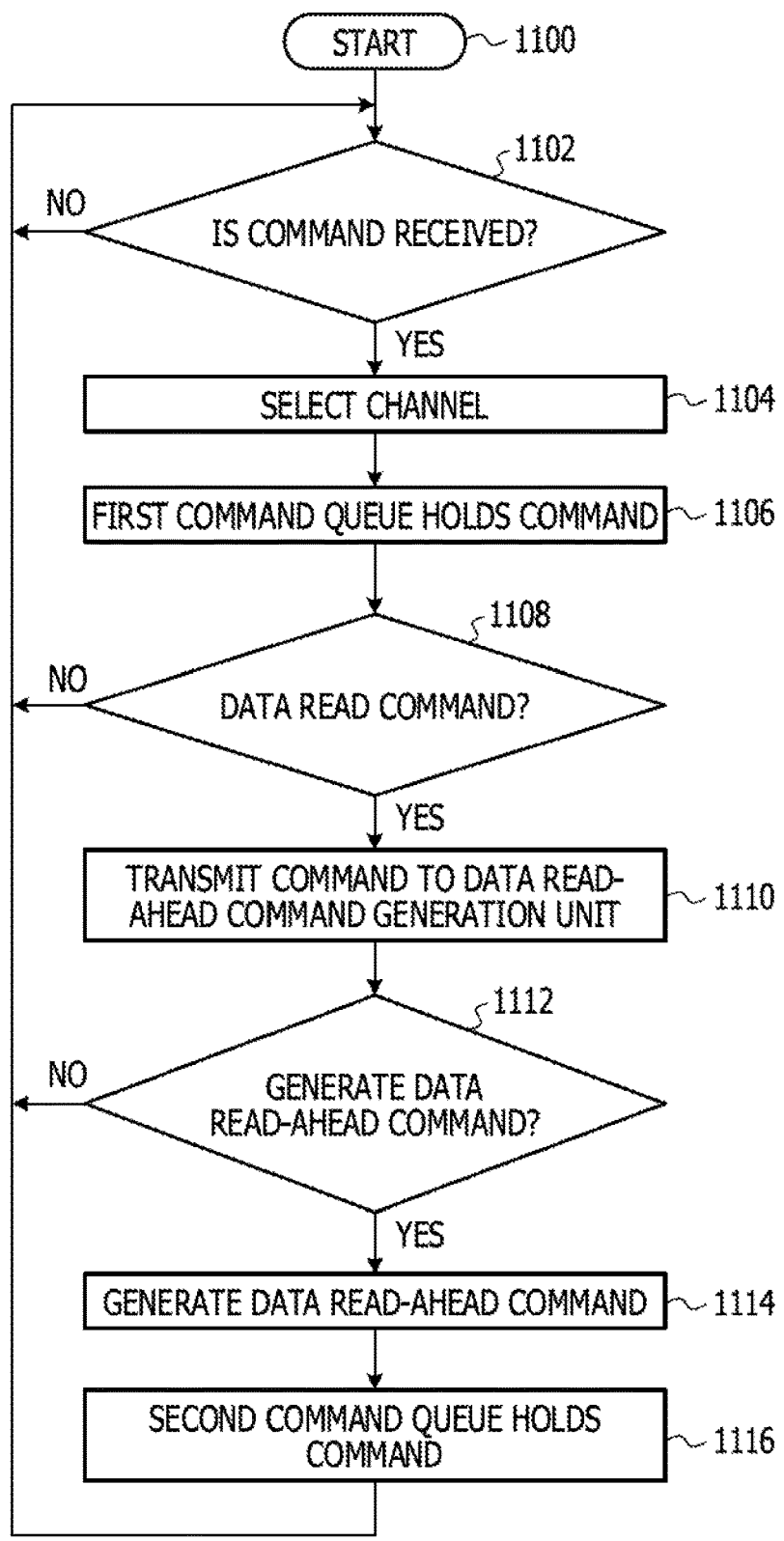
FIG. 9 is a flowchart of processing executed by a memory controller in the first embodiment.

FIG. 9 is a flowchart of processing mainly related to input of a command to the first command queue 212 and the second command queue 215, in the processing executed by the memory controller 200. The processing flow in FIG. 9 is initiated by processing 1100, and in the processing 1102, the command receiving unit 202 determines whether or not a command transmitted from the command transmission unit 114 has been received. In a case where it is determined that the command has been received, the processing flow proceeds to processing 1104, and in a case where it is not determined that the command has been received, the command receiving unit 202 repeatedly executes the processing 1102. After the processing 1102, in the processing 1104, the channel selection unit 204 selects a channel based on the channel information included in the received command. Then, the first command queue 212 of the channel selected in processing 1106 holds the command. In processing 1108, the command receiving unit 202 determines whether or not the received command is a data read command. In a case where it is determined that the command is a data read command, the processing flow proceeds to processing 1110, and in a case where it is not determined that the command is a data read command, the processing flow returns to the processing 1102. In processing 1110, the command receiving unit 202 replicates the received command and transmits the command to the data read-ahead command generation unit 260. In processing 1112, the data read-ahead command generation unit 260 determines necessity of generating a data read-ahead command based on the data read-ahead information included in the replicated command. In the processing 1112, in a case where it is determined that a data read-ahead command has to be generated, the data read-ahead command generation unit 260 generates a data read-ahead command in the processing 1114, and the second command queue 215 holds the generated data read-ahead command in processing 1116. After the processing 1116, the processing flow returns to the processing 1102. In a case where it is not determined that a data read-ahead command has to be generated in processing 1112, the processing flow returns to the processing 1102. The processing 1104, the processing 1106, and the processing after the processing 1108 may be executed in parallel.

Figure 10:
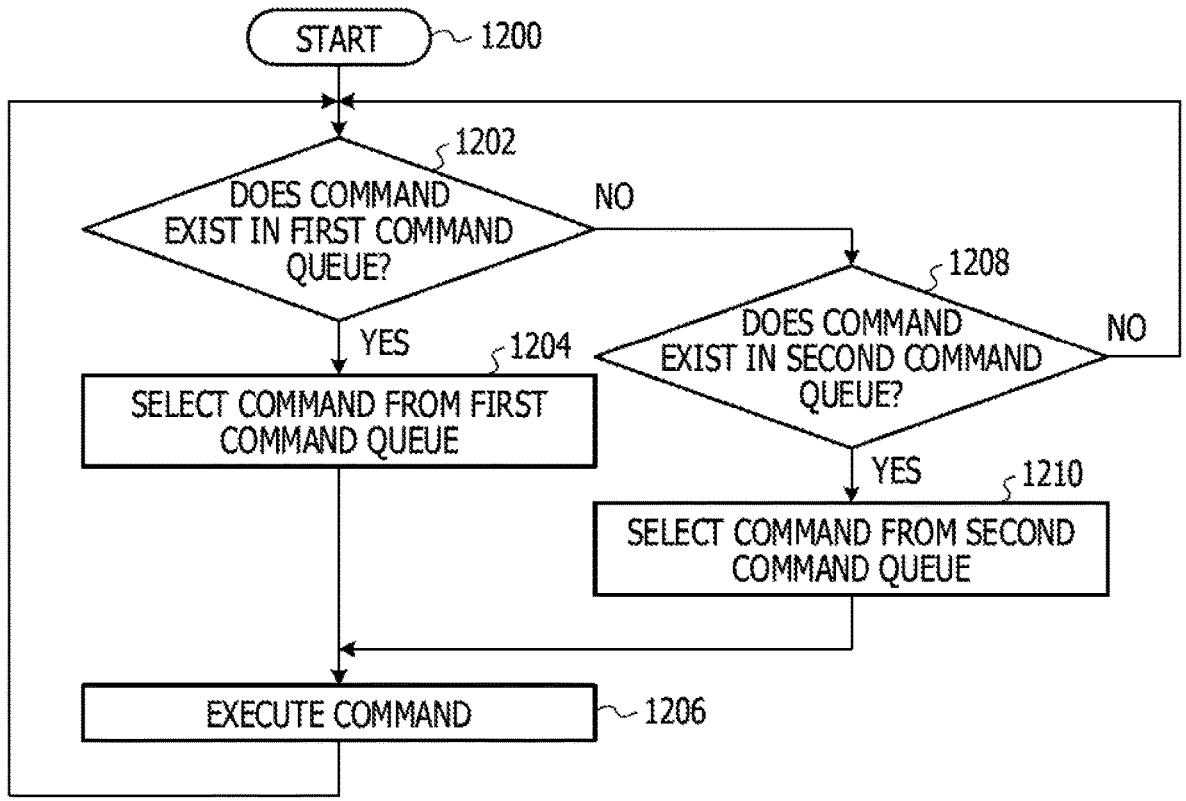
FIG. 10 is a flowchart of processing executed by the memory controller in the first embodiment.

FIG. 10 is a flowchart of processing mainly related to selection and execution of a command held in the first command queue 212 and the second command queue 215, in the processing executed by the memory controller 200. The processing flow in FIG. 10 is initiated by processing 1200, and in processing 1202, the command selection unit 220 determines whether or not a command is stored in the first command queue 212. In a case where it is determined that a command is stored in the first command queue 212, the processing flow proceeds to processing 1204, and in a case where it is not determined that a command is stored in the first command queue 212, the processing flow proceeds to processing 1208. In the processing 1204, the command selection unit 220 selects and retrieves the command at the head of the queue among the commands stored in the first command queue 212. Then, in the processing 1206, the command execution unit 230 executes the command selected in the processing 1204. On the other hand, in a case where the processing flow proceeds from processing 1202 to processing 1208, the command selection unit 220 determines whether or not a data read-ahead command is stored in the second command queue 215 in processing 1208. In a case where it is determined that a data read-ahead command is stored in the second command queue 215, the processing flow proceeds to processing 1210, and in a case where it is not determined that a data read-ahead command is stored in the second command queue 215, the processing flow returns to processing 1202. In the processing 1210, the command selection unit 220 extracts the data read-ahead command at the head of the queue among the commands stored in the second command queue 215. Then, the command execution unit 230 executes the data read-ahead command in the processing 1206. After the processing 1206, the processing flow returns to processing 1202.

Figure 11:
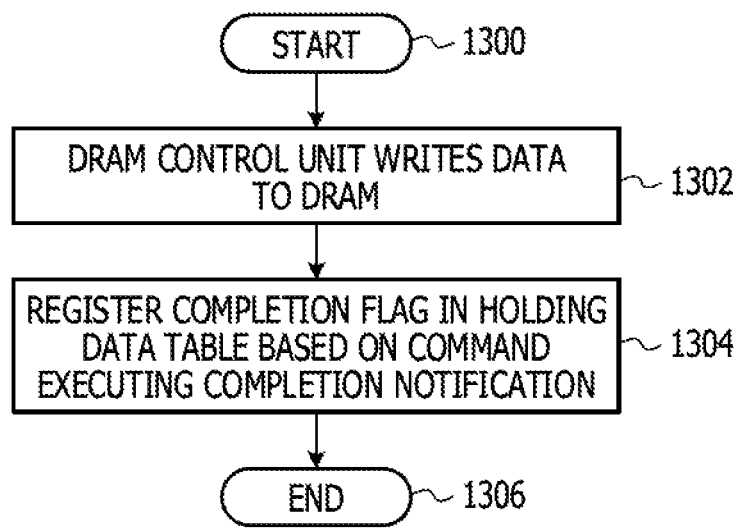
FIG. 11 is a flowchart of processing executed by the CPU in the first embodiment.

FIG. 11 is a flowchart of processing mainly related to writing of data to the DRAM 160 in the processing executed by the CPU 100 of the information processing device 10. The processing flow of FIG. 11 is initiated by processing 1300, and the DRAM control unit 115 writes the data received from the storage 20 to the DRAM 160 in the processing 1302. In processing 1304, the command generation unit 112 or the data read-ahead information generation unit 113 registers the completion flag in the holding data table 132 based on the notification of command execution completion received from the storage 20, and the processing flow ends at processing 1306.

As described above, according to the first embodiment, the information processing device 10 adds data read-ahead information to a normal data-read command when the command is issued. The storage 20 that has received the command generates a data read-ahead command based on the data read-ahead information. The storage 20 inputs the received command (normal data-read command) and the generated data read-ahead command to a command queue provided for each command. In a case where commands are accumulated in the first command queue 212 which is a queue for the commands other than data read-ahead commands, the commands held in the first command queue 212 are preferentially executed over the commands held in the second command queue 215 which is a queue for data read-ahead commands. In this way, execution of a normal data-read command is suppressed from being delayed due to the execution of a data read-ahead command.

Second Embodiment

In the first embodiment, the first command queue 212 for normal data-read commands and the second command queue 215 for data read-ahead commands are provided in parallel so that the normal data-read commands are preferentially executed over the data read-ahead commands. In the second embodiment, the normal data-read commands and the data read-ahead commands are held in a common command queue. However, by controlling the timing to hold a data read-ahead command in the command queue, a normal data-read command is preferentially executed over the data read-ahead command. Note that, FIG. 1 (system configuration diagram), FIG. 2 (hardware configuration diagram of the system), FIG. 4 (functional block diagram of the information processing device 10), FIGS. 5A and 5B (data structure diagram of a normal data-read command), and FIGS. 8 and 11 (flowchart of processing executed by the CPU 100 of the information processing device 10) described in the first embodiment may also be applied to the second embodiment.

Figure 12:
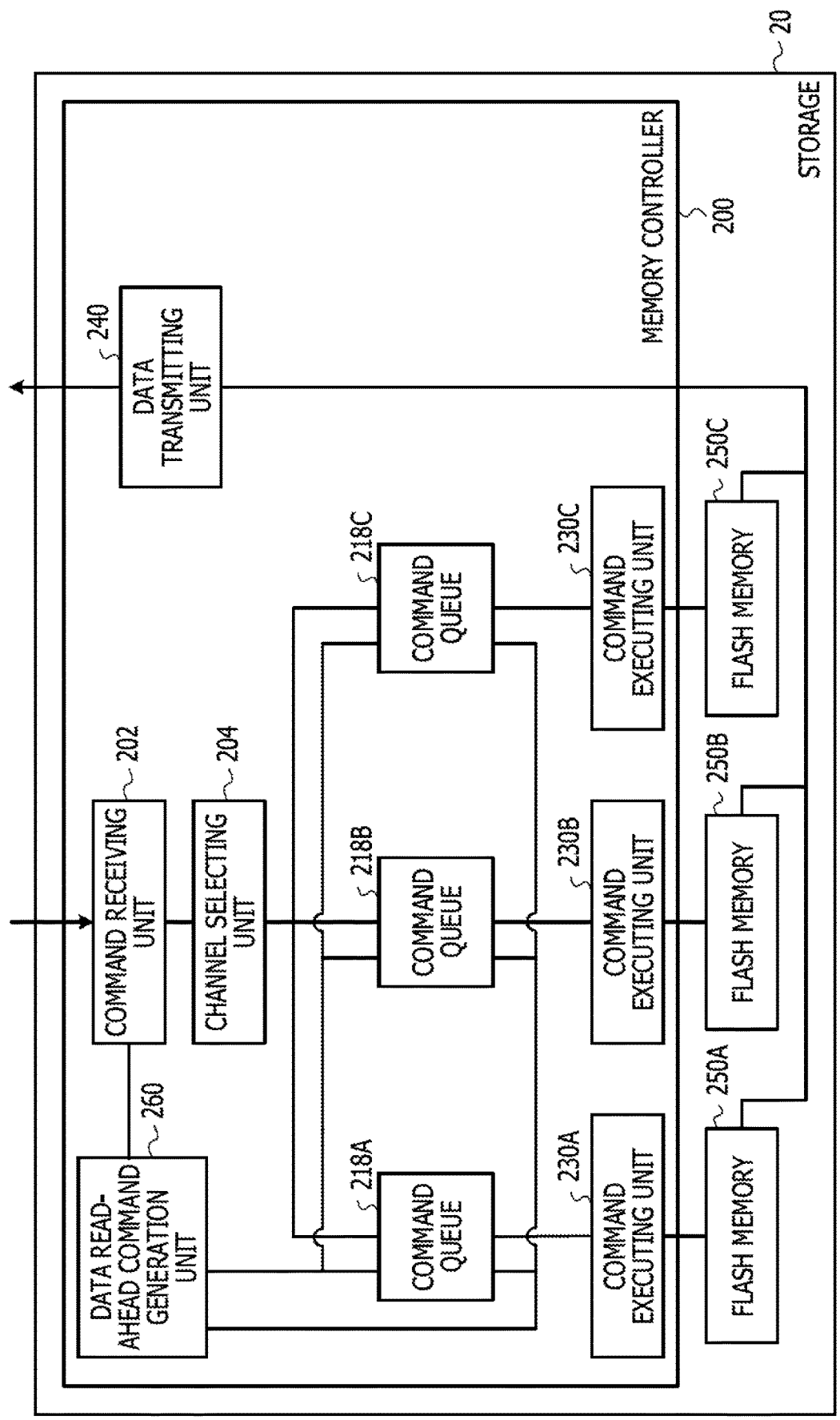
FIG. 12 is a diagram illustrating functional blocks of storage in a second embodiment.

FIG. 12 is a diagram illustrating functional blocks of the storage 20, mainly the memory controller 200 in the second embodiment. The same functional blocks as those illustrated in FIG. 7 are denoted by the same reference numerals as those illustrated in FIG. 7, and the description thereof will be omitted. The memory controller 200 of the storage 20 functions as the command receiving unit 202, the channel selection unit 204, the data read-ahead command generation unit 260, a command queue 218A, 218B and 218C (in a case where there is no intention to specify any one of the three command queues, simply referred to as a "command queue 218"), the command execution units 230A, 230B and 230C, and the data transmission unit 240.

When the command receiving unit 202 receives a normal data-read command from the information processing device 10, the command receiving unit 202 replicates the normal data-read command and transmits the command to the data read-ahead command generation unit 260. The data read-ahead command generation unit 260 monitors the status of the command queue 218 for each channel. For example, the situation of the command queue 218 is a situation regarding the number of the commands held within the command queue 218. Then, the data read-ahead command generation unit 260 generates a data read-ahead command based on the status of the command queue 218 and transmits the command to the command queue 218. In the above example, the command receiving unit 202 has transmitted the replicated command to the data read-ahead command generation unit 260, but as in the first embodiment, instead of the replicated command, the data read-ahead information included in the received command is selectively notified to the data read-ahead command generation unit 260.

Here, it is assumed that a data read-ahead command is generated and input to the command queue 218 in a situation where a number of the commands held in the command queue 218 is equal to or greater than the predetermined number. In this case, there is a possibility that a subsequent command (for example, a normal data-read command) is further input to the command queue 218 during the period in which the data read-ahead command is waiting for execution in the command queue 218. Execution of the subsequent command will be delayed by the time for executing the data read-ahead command. For that reason, in the second embodiment, in a case where commands are not held in the command queue 218 or the number of the commands held in the command queue 218 is equal to or less than a certain value, the data read-ahead command generation unit 260 generates a data read-ahead command and holds the command in the command queue 218. In this way, by controlling the generation timing of a data read-ahead command based on the status of the command queue 218, execution of a normal data-read command is suppressed from being delayed due to the execution of a data read-ahead command.

Figure 13:
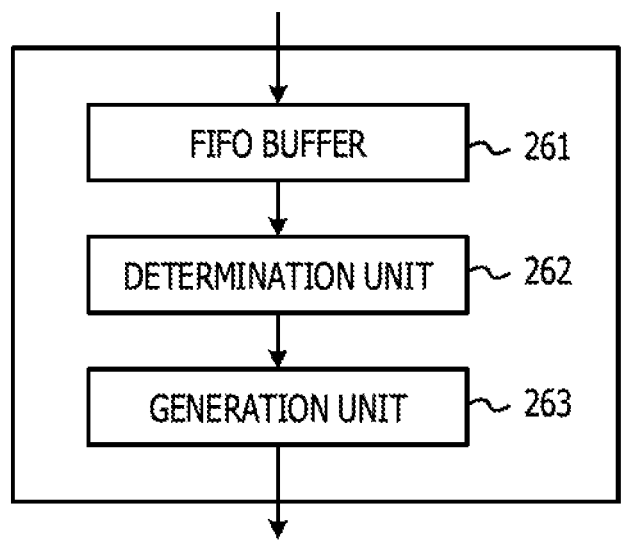
FIG. 13 is a diagram illustrating an example of functional blocks of a data read-ahead command generation unit in the second embodiment.

FIG. 13 is a diagram illustrating functional blocks within the data read-ahead command generation unit 260 illustrated in FIG. 12. The data read-ahead command generation unit 260 includes an FIFO buffer 261, a determination unit 262, and a generation unit 263. The FIFO buffer 261 holds the command transmitted from the command receiving unit 202. The determination unit 262 reads the replicated command from the FIFO buffer 261. In addition, the determination unit 262 receives the status information indicating the status of the command queue 218 from the command queue 218. The determination unit 262 determines whether or not a predetermined condition is satisfied based on the data read-ahead information included in the command read from the FIFO buffer 261 and the status information of the command queue 218. In a case where the predetermined condition is satisfied, the determination unit 262 instructs the generation unit 263 to generate a data read-ahead command. The generation unit 263 generates and transmits the data read-ahead command to the command queue 218 according to an instruction from the determination unit 262.

Next, the predetermined condition used for the determination by the determination unit 262 will be described by giving an example. As a predetermined condition, it is assumed that a condition (hereinafter, referred to as a first condition) that "all of the command queue 218 of the target channel of data read-ahead processing is empty" is set in the determination unit 262. Further, it is assumed that the data read-ahead information included in the command read from the FIFO buffer 261 by the determination unit 262 specifies that a data read-ahead command is generated for each of the first channel, the second channel, and the third channel. Here, the determination unit 262 obtains status information of the command queues 218A, 218B and 218C. From the status information of the command queues 218A, 218B and 218C, the determination unit 262 determines whether or not the command queue 218 of all channels is empty. In a case where it is determined that the command queue 218 of all the channels is empty, that is, it is determined that the predetermined condition is satisfied, the determination unit 262 generates a data read-ahead command for each of the first channel, the second channel, and the third channel in the generation unit 263, and transmits the commands to the command queues 218A, 218B and 218C. Since the command queues 218A, 218B and 218C of all the channels are empty at this point, the data read-ahead command is executed in each channel.

As a predetermined condition used for the determination of the determination unit 262, a condition (hereinafter, referred to as a second condition) that "a certain number or more (for example, two or more) command queues are empty out of the command queue 218 of the target channel of data read-ahead processing" may be applied. In this case, if two or more command queue 218 out of the three command queues 218A, 218B, and 218C are empty, the determination unit 262 determines that the specific condition is satisfied. Then, the determination unit 262 instructs the generation unit 263 to generate a data read-ahead command. In order to avoid that generation of data read-ahead commands is delayed by a situation in which one command queue is not empty out of the three command queues lasts for a long time, the second condition may be set in the determination unit 262 instead of the first condition.

As a predetermined condition used for the determination of the determination unit 262, a condition (hereinafter, referred to as a third condition) that "the number of the commands held in the FIFO buffer 261 is equal to or greater than a predetermined number" may be applied. In this case, the determination unit 262 counts the number of the commands held in the FIFO buffer 261. Then, in a case where the counted number of the command is equal to or greater than the predetermined number, the determination unit 262 determines that the predetermined condition is satisfied regardless of the status of the command queue 218. Then, the determination unit 262 instructs the generation unit 263 to generate a data read-ahead command.

A combination of the above-described first condition to third condition may be used as a predetermined condition used for the determination of the determination unit 262. For example, a condition that "at least one of the first condition and the third condition is satisfied" may be applied. In this case, even if the first condition is not satisfied, in a case where the third condition is satisfied, the determination unit 262 instructs the generation unit 263 to generate a data read-ahead command. This makes it possible to avoid the capacity of the FIFO buffer 261 from becoming saturated and failing to receive a new command without satisfying the first condition.

Further, in a case where the above-described first condition to third condition or a combination of these conditions is set in the determination unit 262, in a state where commands are held in the FIFO buffer 261, in a case where a period in which the set condition is not satisfied lasts for a predetermined period of or more, the data read-ahead command generation unit 260 may be configured so that the determination unit 262 instructs the generation unit 263 to generate a data read-ahead command. In this case, execution of the data read-ahead processing is avoided from being delayed due to the fact that a specific condition is not satisfied.

Figure 14:
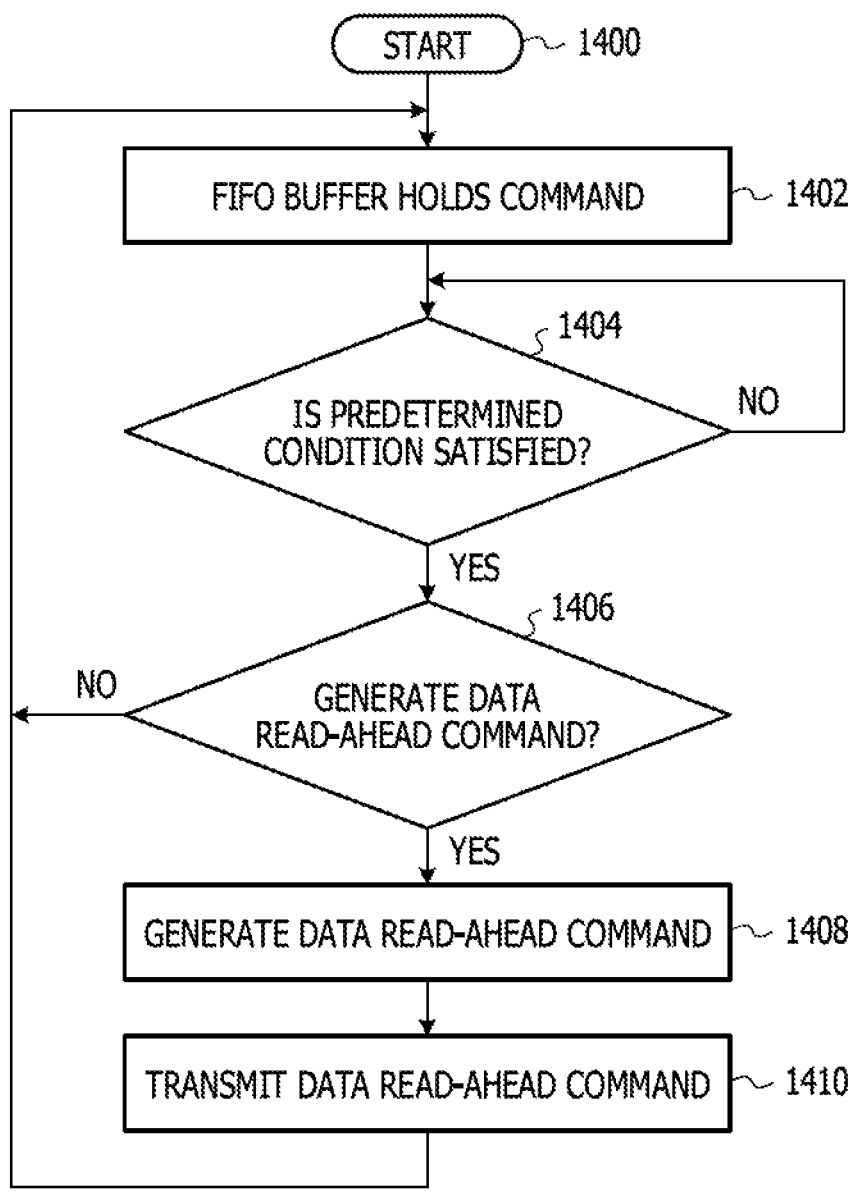
FIG. 14 is a flowchart of processing executed by the data read-ahead command generation unit illustrated in FIG. 13.

FIG. 14 is a flowchart of processing executed by the data read-ahead command generation unit 260. The processing flow is initiated by processing 1400, and in processing 1402, the FIFO buffer 261 holds the command transmitted from the command receiving unit 202. In processing 1404, the determination unit 262 determines whether or not a predetermined condition is satisfied. As the predetermined condition, for example, any one of the first condition to the third condition described above, or any combination of the first condition to the third condition, is set. In a case where it is not determined that the predetermined condition is satisfied, the determination unit 262 repeatedly executes the processing 1404, and in a case where it is determined that the predetermined condition is satisfied, the processing flow proceeds to processing 1406. In the processing 1406, the generation unit 263 determines whether or not generation of a data read-ahead command is requested based on the data read-ahead information of the command. In a case where it is not determined that generation of a data read-ahead command is requested, the processing flow returns to the processing 1402, and in a case where it is determined that generation of a data read-ahead command is requested, the processing flow proceeds to processing 1408. In the processing 1408, the generation unit 263 generates a data read-ahead command, and the generation unit 263 transmits the data read-ahead command to the command queue 218 in the processing 1410. Then, the processing flow returns to the processing 1402.

Figure 15:
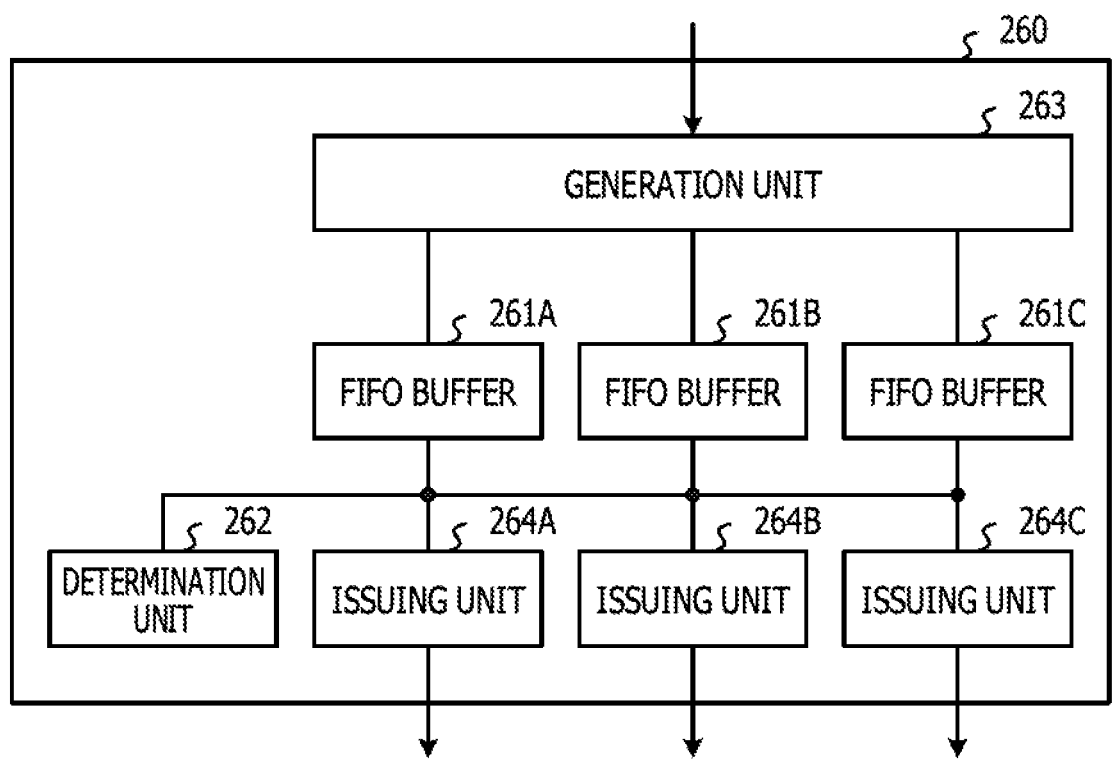
FIG. 15 is a diagram illustrating another example of functional blocks of the data read-ahead command generation unit in the second embodiment.

FIG. 15 is another example of functional blocks of the data read-ahead command generation unit 260. In FIG. 15, the data read-ahead command generation unit 260 includes the generation unit 263, the FIFO buffers 261A, 261B, and 261C (in a case where there is no intention to specify any one of the three FIFO buffers, simply referred to as an "FIFO buffer 261"), the determination unit 262, and the issuing units 264A, 264B, and 264C (in a case where there is no intention to specify any one of the three issuing units, simply referred to as an "issuing unit 264"). The generation unit 263 receives the command transmitted from the command receiving unit 202 and generates a data read-ahead command for each channel. The FIFO buffers 261A, 261B, and 261C are placed in the rear stage of the generation unit 263, and hold the data read-ahead commands generated by the generation unit 263 for each channel. The FIFO buffers 261A, 261B and 261C correspond to the first channel, the second channel, and the third channel, respectively. The determination unit 262 obtains the status information of the command queue 218 and determines whether or not the predetermined condition is satisfied for each channel. The issuing unit 264 transmits the data read-ahead command held in the FIFO buffer 261 to the command queue 218 of the corresponding channel with respect to the channel satisfying the specific condition.

Next, the predetermined condition used for the determination by the determination unit 262 will be described by giving an example. As a predetermined condition, it is assumed that a condition (hereinafter, referred to as a fourth condition) that "the command queue 218 of a corresponding channel is empty" is set in the determination unit 262. Further, it is assumed that a data read-ahead command is held in the FIFO buffer 261A corresponding to the first channel. The determination unit 262 obtains the status information of the command queue 218 corresponding to each channel. For example, in a case where the command queue 218A corresponding to the first channel is empty, the determination unit 262 instructs the issuing unit 264A to issue the data read-ahead command held in the FIFO buffer 261A for the command queue 218A. The issuing unit 264A transmits the data read-ahead command held in the FIFO buffer 261A to the command queue 218A based on the instruction of the determination unit 262.

As a predetermined condition used for the determination of the determination unit 262, a condition (hereinafter, referred to as a fifth condition) that "the number of the commands held in the FIFO buffers 261A, 261B, and 261C respectively is equal to or greater than a predetermined number" may be applied. In this case, the determination unit 262 counts the number of the commands held in the FIFO buffers 261A, 261B and 261C, respectively. Then, the determination unit 262 instructs the corresponding issuing unit 264 to transmit the data read-ahead command held in the FIFO buffer 261 whose counted command number is equal to or greater than the predetermined number to the command queue 218.

A combination of the above-described fourth condition and fifth condition may be used as a predetermined condition used for the determination of the determination unit 262. For example, the condition that "at least one of the fourth condition and the fifth condition is satisfied" may be applied. In this case, even if the fourth condition is not satisfied, in a case where the fifth condition is satisfied, the determination unit 262 instructs the issuing unit 264 to issue the data read-ahead command. This makes it possible to avoid the capacity of the FIFO buffer 261 from becoming saturated and failing to hold a new data read-ahead command without satisfying the fourth condition.

Further, in a case where the above-described fourth or fifth condition, or a combination of these conditions is set in the determination unit 262, in a state where the data read-ahead command is held in the FIFO buffer 261, in a case where a period in which the set condition is not satisfied lasts for a predetermined period of or more, the data read-ahead command generation unit 260 may be configured so that the determination unit 262 instructs the issuing unit 264 to issue the data read-ahead command. In this case, execution of the data read-ahead processing is avoided from being delayed due to the fact that the predetermined condition is not satisfied.

Figure 16:
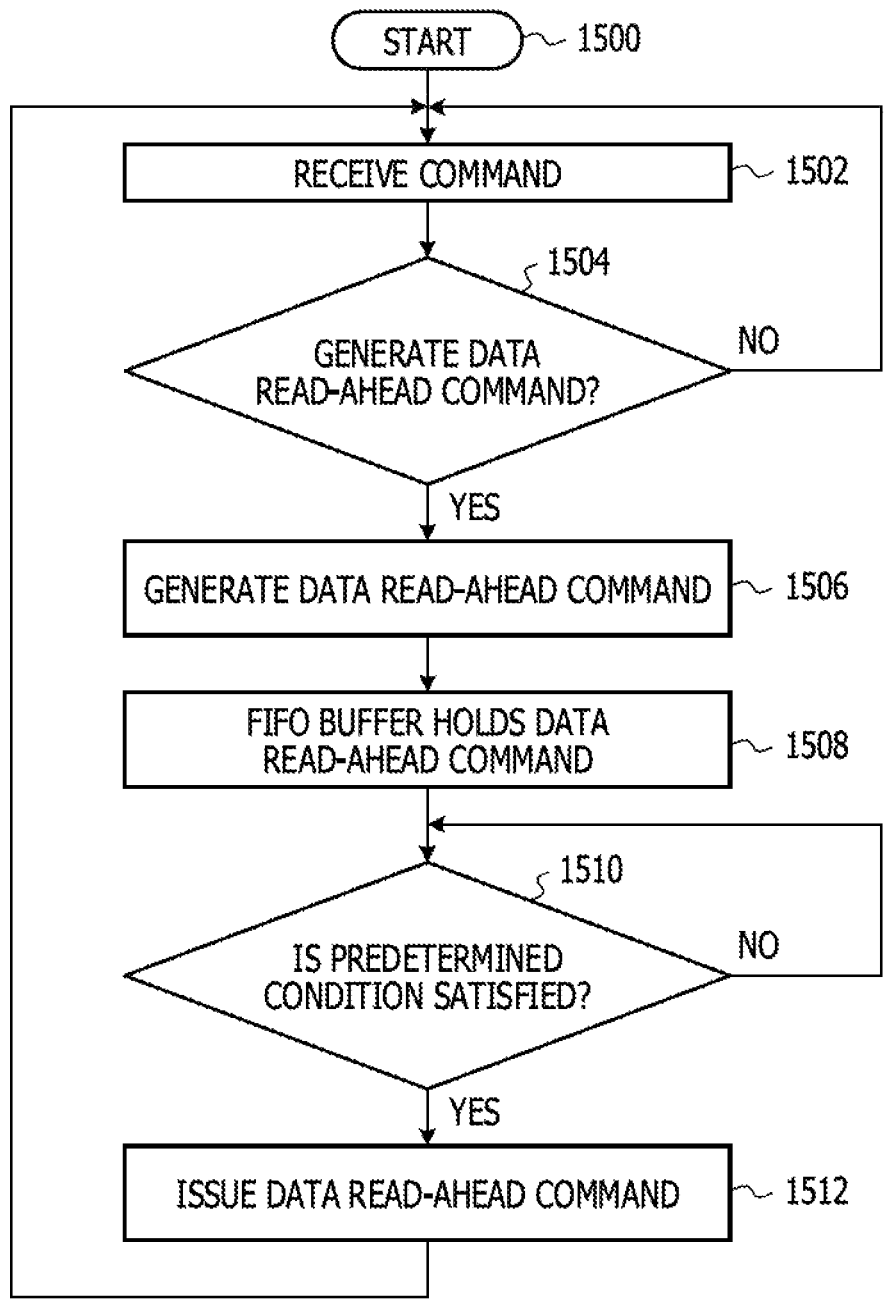
FIG. 16 is a flowchart of processing executed by the data read-ahead command generation unit illustrated in FIG. 15.

FIG. 16 is a flowchart of processing executed by the data read-ahead command generation unit 260 illustrated in FIG. 15. The processing flow is initiated by processing 1500, and in processing 1502, the generation unit 263 receives the command transmitted from the command receiving unit 202. In the processing 1504, the generation unit 263 determines whether generation of a data read-ahead command is requested based on the data read-ahead information of the command. In a case where it is not determined that generation of a data read-ahead command is requested, the processing flow returns to the processing 1502, and in a case where it is determined that generation of a data read-ahead command is requested, the processing flow proceeds to processing 1506. In the processing 1506, the generation unit 263 generates a data read-ahead command, and the FIFO buffer 261 holds the generated data read-ahead command in processing 1508. In processing 1510, the determination unit 262 determines whether or not a predetermined condition is satisfied. As the predetermined condition, for example, any one of the fourth condition and the fifth condition described above, or any combination of the fourth condition and the fifth condition, is set. In a case where it is not determined that the predetermined condition is satisfied, the determination unit 262 repeatedly executes the processing 1510, and in a case where it is determined that the predetermined condition is satisfied, the processing flow proceeds to processing 1512. In the processing 1512, the issuing unit 264 issues the data read-ahead command held in the FIFO buffer 261 to the command queue 218. Then, the processing flow returns to the processing 1502.

Thus, in the second embodiment, the timing at which a data read-ahead command is input from the data read-ahead command generation unit 260 to the command queue 218 is controlled, so that execution of a normal data-read command is suppressed from being delayed.

Third Embodiment

In the third embodiment, it is monitored whether or not the data read from the flash memory 250 by the data read-ahead command has been actually used for the operation by the operation processing unit 102. Then, with respect to the data read by a data read-ahead command (hereinafter, referred to as a "read-ahead data") and actually not used for the operation, a data read-ahead command will not be issued subsequently. In this way, issuing of an unnecessary data read-ahead command is suppressed. Note that, FIG. 1 (system configuration diagram), FIG. 2 (hardware configuration diagram of the system), FIGS. 5A and 5B (data configuration diagram of a normal data-read command), FIGS. 6A and 6B (example of contents of the holding data table 132), FIG. 7 (functional block diagram of the storage 20), FIGS. 8 and 11 (flowchart of processing executed by the CPU 100 of the information processing device 10), and FIGS. 9 and 10 (flowchart of processing executed by the memory controller 200) described in the first embodiment may also be applied to the third embodiment. In addition, FIG. 12 (functional block diagram of the storage 20), FIGS. 13 and 15 (functional block diagram of the data read-ahead command generation unit 260), FIGS. 14 and 16 (flowchart of processing executed by the data read-ahead command generation unit 260) described in the second embodiment may also be applied to the third embodiment.

FIG. 17 is a diagram illustrating functional blocks of the CPU 100 of the information processing device 10 in the third embodiment. The same functional blocks (FIG. 4) as those illustrated in the first embodiment are denoted by the same reference numerals as those illustrated in FIG. 4, and the description thereof will be omitted. In addition to the functional blocks illustrated in FIG. 4, the CPU 100 functions as a recording unit 121, a monitoring unit 122, a timer 123, a determination unit 124, and a flag reset unit 125. Further, the CPU 100 includes a read-ahead list table 141.

FIGS. 18A and 18B are diagrams illustrating an example of the contents of a read-ahead list table 141. The "logical address", a "write time", and a "determination flag" may be registered in the read-ahead list table 141. When the data read-ahead information generation unit 113 generates data read-ahead information, the recording unit 121 records the logical address corresponding to the flash memory address specified by the data read-ahead information, in the "logical address" of the read-ahead list table 141. In addition, the recording unit 121 obtains the reception time of the notification of command execution completion for the data read-ahead command transmitted from the storage 20, from the timer 123, and records the obtained time in the "write time" of the read-ahead list table 141. In FIG. 18A, it is recorded that the data read-ahead command is issued for the data of the logical address "a", "b" and "c", respectively. Further, it is recorded that notifications of command execution completion are received by the data read-ahead information generation unit 113, which indicates that execution of the data read-ahead commands has been completed respectively at "09:13:21.37", "09:13:21.89", and "9:13:22.15".

After a data read-ahead command is generated, the monitoring unit 122 monitors whether or not the data read from the flash memory 250 was actually used by the operation processing unit 102. Specifically, the monitoring unit 122 monitors the contents registered in the read-ahead list table 141, the command generation request received by the command generation request receiving unit 111, and the time measured by the timer 123. Then, it is determined whether or not the logical address of the data requested to be read by the command generation request is recorded in the read-ahead list table 141. In a case where the corresponding logical address is recorded in the read-ahead list table 141, and a predetermined period of (for example, 1 second) has not yet elapsed from the write time recorded in the read-ahead list table 141, the corresponding logical address is deleted from the read-ahead list table 141. Conversely, even if the predetermined period of has elapsed from the write time recorded in the read-ahead list table 141, in a case where generation of a data read command for the logical address is not requested, the determination flag is recorded in the read-ahead list table 141. In other words, the determination flag of the read-ahead list table 141 means that the read-ahead processing of the data has been performed for the logical address, but the read-ahead data read was not actually used for the operation by the operation processing unit 102. FIG. 18B is a diagram illustrating a state in which the contents of the read-ahead list table 141 exemplified in FIG. 18A are updated. In FIG. 18B, it is illustrated how generation of a data read command for the logical address "a" is not requested within a predetermined period of, and the determination flag is registered for the logical address "a" after read-ahead processing of the data for the logical address "a" is performed. On the other hand, after data read-ahead processing for the logical address "b" is performed, generation of a data read command is requested for the logical address "b" within a predetermined period of, and the logical address "b" is deleted from the data read-ahead list table 141. Regarding a logical address "c", a predetermined period of has not yet elapsed since the read-ahead processing of the data is performed, and the determination flag is not yet attached.

In this way, logical addresses having no record of being used are accumulated in the read-ahead list table 141 as past results.

Next, how to use the read-ahead list table 141 generated by the above method will be described. The command generation request unit 104 requests generation of a data read command, and the command generation request receiving unit 111 receives the generation request. Based on the generation request, the data read-ahead information generation unit 113 specifies a logical address to be the target of data read-ahead processing based onftheh a predetermined algorithm. Here, the determination unit 124 determines whether or not the specified logical address is recorded in the read-ahead list table 141. In a case where the specified logical address is recorded in the read-ahead list table 141 and the determination flag is registered for the logical address, the determination unit 124 determines that generation of a data read-ahead command that is targeting the logical address is unnecessary. Then, the determination unit 124 notifies the data read-ahead information generation unit 113 that generation of a data read-ahead command is unnecessary. In this way, it is possible not to perform data read-ahead processing again on the data read by the data read-ahead command in the past and actually not used for operation.

Figure 19:
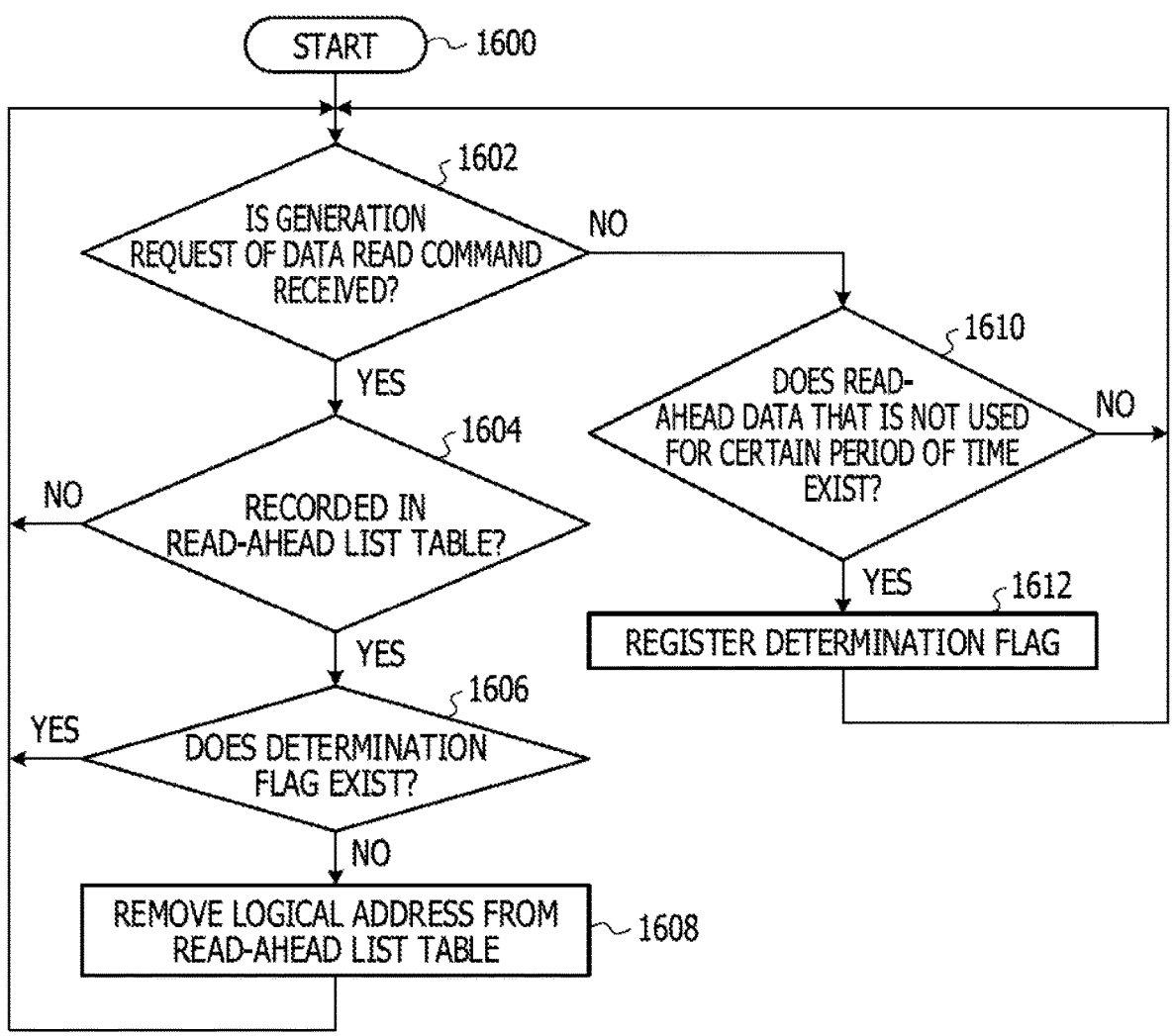
FIG. 19 is a flowchart of processing executed by a CPU in the third embodiment.

FIG. 19 is a flowchart of processing performed mainly by the monitoring unit 122 in the processing performed by the CPU 100 of the information processing device 10 in the third embodiment. The processing flow in FIG. 19 is initiated by processing 1600, and in processing 1602, the monitoring unit 122 determines whether or not a the generation request of a data read command is received by the command generation request receiving unit 111. In the processing 1602, in a case where it is determined that a generation request of a data read command has been received, the processing flow proceeds to processing 1604, and in a case where it is not determined that a data read command has been received, the processing flow proceeds to processing 1610.

First, a case where the processing flow proceeds to the processing 1604 will be described. In the processing 1604, the monitoring unit 122 determines whether or not the logical address specified by the received generation request is recorded in the read-ahead list table 141. In the processing 1604, in a case where it is determined that the specified logical address is recorded in the read-ahead list table 141, the processing flow proceeds to processing 1606, and in a case where it is not determined that the specified logical address is recorded in the read-ahead list table 141, the processing flow returns to the processing 1602. In the processing 1606, the monitoring unit 122 determines whether or not the determination flag is registered in the logical address registered in the read-ahead list table 141. In processing 1606, in a case where it is not determined that the determination flag is registered, the processing flow proceeds to processing 1608, and in a case where it is determined that the determination flag is registered, the processing flow returns to the processing 1602. In the processing 1608, the monitoring unit 122 instructs the recording unit 121 to delete the corresponding logical address from the read-ahead list table 141, and the recording unit 121 deletes the logical address from the read-ahead list table 141.

On the other hand, in a case where the processing flow proceeds from the processing 1602 to the processing 1610, in the processing 1610, the monitoring unit 122 determines whether or not there is the read-ahead data that has not been used for a certain period of time after being read from the flash memory 250. Specifically, the monitoring unit 122 performs the determination of the processing 1610 based on the difference between the time measured by the timer 123 and the write time recorded in the read-ahead list table 141. In the processing 1610, in a case where it is not determined that there is the read-ahead data which has not been used for the certain period of time, the processing flow returns to the processing 1602, and in a case where it is determined that there is the read-ahead data which has not been used for the certain period of time, the processing flow proceeds to processing 1612. In the processing 1612, the monitoring unit 122 instructs the recording unit 121 to register the determination flag in the column of the read-ahead data which has not been used for the certain period of time, and the recording unit 121 registers the determination flag in the read-ahead list table 141. After the processing 1612, the processing flow returns to the processing 1602. In this way, the records of the read-ahead data that has been used are accumulated in the read-ahead list table 141 and will be referred to in generating a data read-ahead information thereafter.

Figure 20:
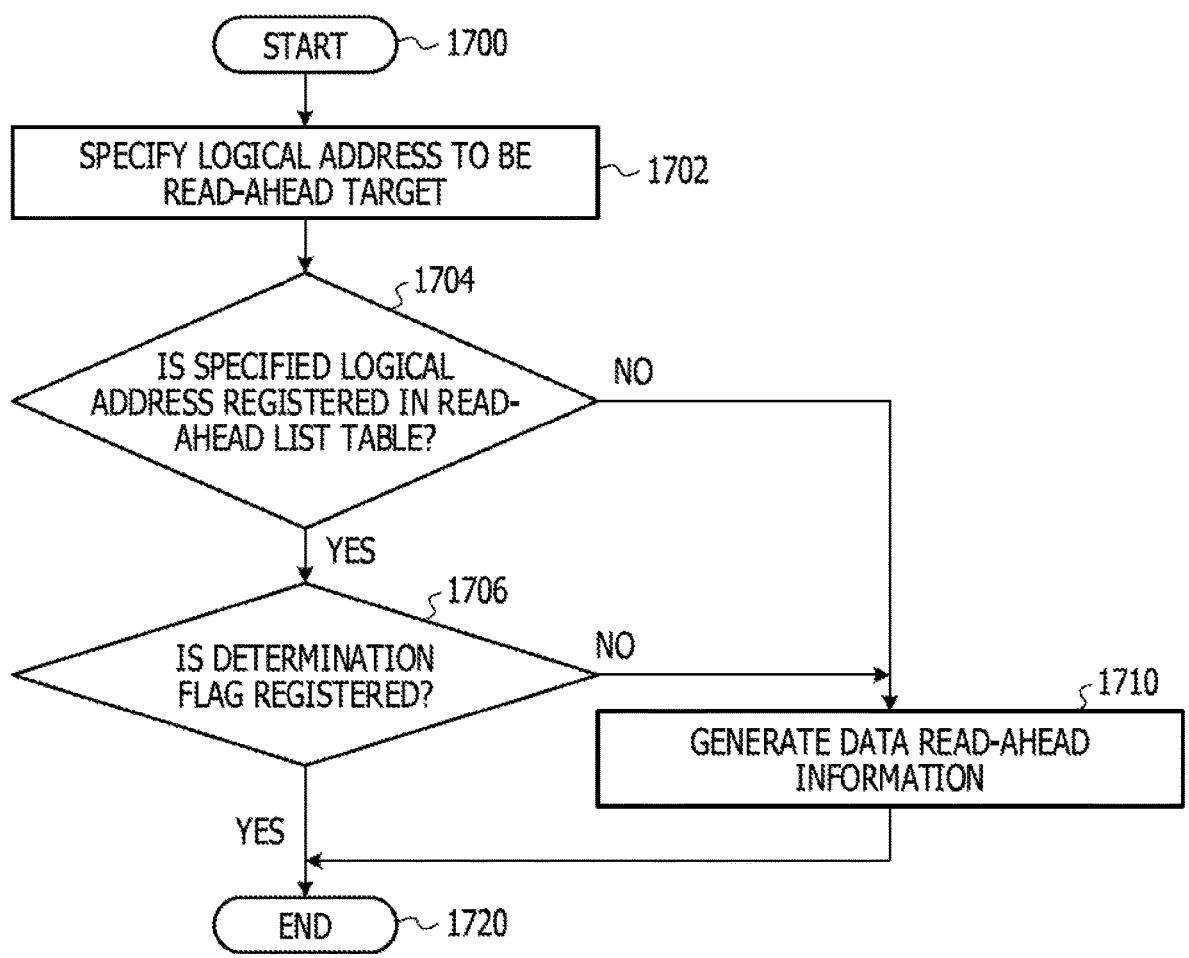
FIG. 20 is a flowchart of processing executed by the CPU in the third embodiment.

FIG. 20 is a flowchart of processing related to generation of data read-ahead information in the processing performed by the CPU 100 of the information processing device 10 in the third embodiment. The processing flow illustrated in FIG. 20 corresponds to the processing 1016 illustrated in FIG. 8. The processing flow is initiated by the processing 1700, and in processing 1702, the data read-ahead information generation unit 113 specifies a logical address to be the target of read-ahead. In processing 1704, the determination unit 124 determines whether or not the logical address specified in the processing 1702 is recorded in the read-ahead list table 141. In a case where it is determined that the specified logical address is recorded in the read-ahead list table 141, the processing flow proceeds to processing 1706, and in a case where it is not determined that the specified logical address is recorded in the read-ahead list table 141, the processing flow proceeds to processing 1710. In the processing 1706, the determination unit 124 determines whether or not the determination flag is registered in the read-ahead list table 141 for the specified logical address. In a case where it is determined that the determination flag is registered, the processing flow ends at processing 1720. In this case, "0" indicating that generation of a data read-ahead command is unnecessary is generated as the data read-ahead information. In a case where it is not determined that the determination flag is registered, the processing flow proceeds to the processing 1710. In the processing 1710, the data read-ahead information generation unit 113 generates "1" indicating that a data read-ahead command has to be generated as the data read-ahead information and a flash memory address to be the target of data read-ahead processing as the data read-ahead information, and the processing flow ends at the processing 1720.

Thus, in the third embodiment, it is monitored whether or not the read-ahead data read from the flash memory 250 by data read-ahead processing has been used by the operation processing unit 102 thereafter. In a case where the read-ahead data has not been used in the operation processing by the operation processing unit 102 within a certain period of time after being read, the logical address of the read-ahead data associated with the determination flag is recorded in the read-ahead list table 141. Then, the data read-ahead command for that logical address is not subsequently issued. In this way, issuing the data read-ahead command for the data that is unlikely to be used is suppressed.

Next, the flag reset unit 125 illustrated in FIG. 17 will be described. In a case where a data write command is issued from the command generation unit 112 to the flash memory 250, the flag reset unit 125 has a function for deleting the logical address and the determination flag of which data is rewritten by the command, from the read-ahead list table 141. In a case where a data write command is issued, since the data content stored in the flash memory 250 is changed, the logical address and the determination flag of which data is stored in a certain flash memory address before the change, are reset.

So far, the third embodiment has been described. Next, a modification example of the third embodiment will be described. In the third embodiment, an example was disclosed in which, with respect to the read-ahead data that has not been used within a certain period of time, a determination flag indicating the read-ahead data being unused after data read-ahead processing is registered. In the modification example of the third embodiment, the determination flag is registered at the time the read-ahead data is removed from the area in which the read-ahead data of the DRAM 160 has been held.

In the present modification example, the time at which read-ahead data is written to the DRAM 160 is recorded in the holding data table 132. The time information recorded in the holding data table 132 is overwritten by the time when the read-ahead data is used in a case where the read-ahead data is used in the operation processing unit 102. The DRAM control unit 115 sequentially writes new read-ahead data read from the flash memory 250 to the DRAM 160, while performing an operation of removing the read-ahead data in the order that the read-ahead data is older than the time specified by the time information recorded in the holding data table 132. For example, in a case where the free space of the area allocated for the read-ahead data in the data holding area of the DRAM 160 becomes equal to or less than a threshold value, the data is removed in the order that the data is older than the time specified by the time information recorded in the holding data table 132. In addition, in a case where the read-ahead data is removed from the DRAM 160, the DRAM control unit 115 updates the contents of the holding data table 132. That is, in a case where the read-ahead data is removed from the DRAM 160, the corresponding logical address is deleted from the holding data table 132.

The monitoring unit 122 monitors the contents of the holding data table 132. For example, it is assumed that the logical address "a" recorded in the holding data table 132 is removed. In this case, the monitoring unit 122 accesses the read-ahead list table 141 and determines whether or not the logical address "a" is recorded in the read-ahead list table 141. If the logical address "a" is recorded in the read-ahead list table 141, the monitoring unit 122 instructs the recording unit 121 to register the determination flag corresponding to the logical address "a". In this way, the determination flag is registered for the logical address "a". In addition, the monitoring unit 122 detects the command generation request that has been received by the command generation request receiving unit 111. For example, it is assumed that the command generation request receiving unit 111 receives a generation request of a data read command specifying the logical address "a". In this case, the monitoring unit 122 determines whether or not the logical address "a" is recorded in the read-ahead list table 141. In a case where the logical address "a" is recorded in the read-ahead list table 141, the monitoring unit 122 further determines whether or not the determination flag corresponding to the logical address "a" is registered. In a case where the determination flag is not registered, the monitoring unit 122 instructs the recording unit 121 to remove the logical address "a" from the read-ahead list table 141. In this way, the logical address "a" is removed from the read-ahead list table 141.

Figure 21:
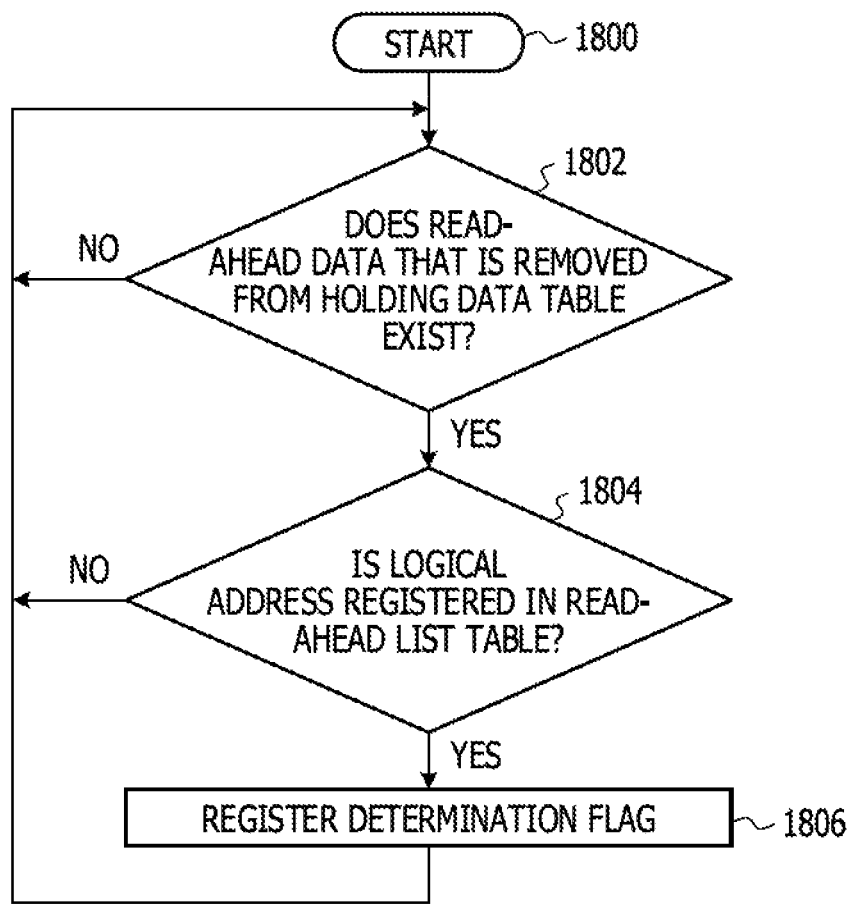
FIG. 21 is a flowchart of processing executed by the CPU in a modification example of the third embodiment.

FIG. 21 is a flowchart of processing related to registration of the determination flag in the processing executed by the CPU 100 in a modification example of the third embodiment. The processing flow is initiated by processing 1800 and in processing 1802, the monitoring unit 122 determines whether or not there is the read-ahead data removed from the holding data table 132. In a case where it is determined that there is the removed read-ahead data, the processing flow proceeds to processing 1804 and in a case where it is not determined that there is the removed read-ahead data, the monitoring unit 122 repeatedly executes the processing 1802. In the processing 1804, the monitoring unit 122 determines whether or not the logical address corresponding to the read-ahead data removed from the holding data table 132 is recorded in the read-ahead list table 141. In a case where it is determined that the logical address corresponding to the removed read-ahead data is recorded in the read-ahead list table 141, the processing flow proceeds to processing 1806, and in a case where it is not determined that the logical address corresponding to the removed the read-ahead data is recorded in the read-ahead list table 141, the processing flow returns to the processing 1802. In the processing 1806, the monitoring unit 122 instructs the recording unit 121 to register the determination flag for the logical address recorded in the read-ahead list table 141, and the recording unit 121 registers the determination flag. After the processing 1806, the processing flow returns to the processing 1802.

Figure 22:
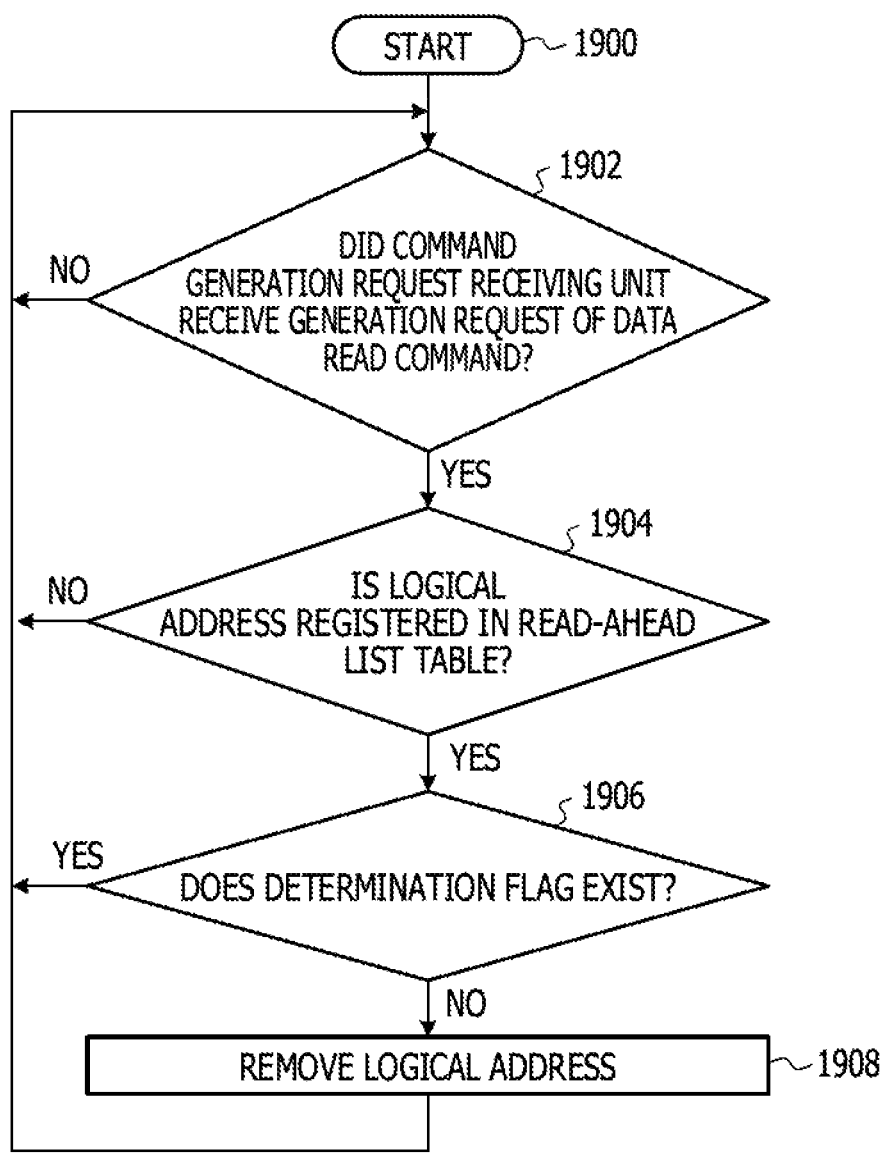
FIG. 22 is a flowchart of processing executed by the CPU in a modification example of the third embodiment.

FIG. 22 is a flowchart of processing for removing the logical address from the read-ahead list table 141 in the processing executed by the CPU 100 in the modification example of the third embodiment. The processing flow is initiated by the processing 1900, and in processing 1902, the monitoring unit 122 determines whether or not a generation request of a data read command has been received by the command generation request receiving unit 111. In a case where it is determined that a generation request of a data read command has been received, the processing flow proceeds to processing 1904, and in a case where it is not determined that a generation request of a data read command has been received, the monitoring unit 122 repeatedly executes the processing 1902. In the processing 1904, the monitoring unit 122 determines whether or not the logical address specified in the command generation request is recorded in the read-ahead list table 141. In a case where it is determined that the logical address specified by the command generation request is recorded, the processing flow proceeds to processing 1906, and in a case where it is not determined that the logical address specified in the command generation request is recorded, the processing flow returns to processing 1902. In the processing 1906, the monitoring unit 122 determines whether or not the determination flag is registered in the logical address specified in the command generation request. In a case where it is not determined that the determination flag is registered, the processing flow proceeds to processing 1908, and in a case where it is determined that the determination flag is registered, the processing flow returns to the processing 1902. Then, in the processing 1908, the monitoring unit 122 instructs the recording unit 121 to remove the logical address recorded in the read-ahead list table 141, and the recording unit 121 removes the logical address from the read-ahead list table 141. The processing flow returns to the processing 1902 after the processing 1908.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a first processor;
a second processor coupled to the first processor;
a first buffer circuit coupled to the second processor; and
a plurality of first memories coupled to the second processor,
the first processor is configured to generate a first read command specifying a first data stored in a first address area of one of the first memories,
the second processor is configured to generate, based on the first read command and data read-ahead information including information indicating whether generating a data read-ahead command for each of channels is necessary, a second read command specifying a second data as the data read-ahead command stored in a second address area of one of the first memories different from the first address area, the second read command including channel information specifying which one of the first memories the second data is stored,
the first buffer circuit is configured to store the first read command and the second read command,
the second processor is configured to count the read command stored in the first buffer circuit, and generate the second read command for a channel where the data read-ahead information indicates the generation of the data read-ahead command when a number of the counted read command is equal to or less than a first value, and
the second processor is configured to execute the first read command and the second read command stored in the first buffer circuit.

2. The information processing system according to claim 1, wherein the first processor is configured to predict, based on the first address area, that the second data is used for data processing by the first processor, and to specify, based on the prediction, the second address area.

3. The information processing system according to claim 1, further comprising:
   a second buffer circuit coupled to the second processor and configured to store the generated second read command, wherein
   the second processor is configured to transmit the generated second read command stored in the second buffer circuit to the first buffer circuit when a number of the second read command stored in the second buffer circuit is equal to or greater than a second value.

4. The information processing system according to claim 1, wherein the second processor and the first buffer circuit are included in an FPGA.

5. The information processing system according to claim 3, wherein the second processor, the first buffer circuit and the second buffer circuit are included in an FPGA.

6. The information processing system according to claim 1, wherein the first buffer circuit is an FIFO buffer.

7. The information processing system according to claim 3, wherein
   the first buffer circuit is an FIFO buffer, and
   the second buffer circuit is another FIFO buffer.

\* \* \* \* \*